United States Patent
Rajanna

(10) Patent No.: US 12,407,413 B1
(45) Date of Patent: Sep. 2, 2025

(54) OPTICAL COMMUNICATION SYSTEMS USING PHYSICAL LAYER RATELESS CODEC TECHNOLOGY FOR FORWARD ERROR CORRECTION

(71) Applicant: Amogh Rajanna, Minneapolis, MN (US)

(72) Inventor: Amogh Rajanna, Minneapolis, MN (US)

(*) Notice: Subject to any disclaimer, the term of this patent is extended or adjusted under 35 U.S.C. 154(b) by 0 days.

(21) Appl. No.: 19/182,730

(22) Filed: Apr. 18, 2025

(51) Int. Cl.
- *H04B 10/118* (2013.01)
- *H04B 10/50* (2013.01)
- *H04B 10/54* (2013.01)
- *H04B 10/69* (2013.01)
- *H04L 1/00* (2006.01)

(52) U.S. Cl.
CPC ......... *H04B 10/118* (2013.01); *H04B 10/503* (2013.01); *H04B 10/541* (2013.01); *H04B 10/69* (2013.01); *H04L 1/0042* (2013.01); *H04L 1/0047* (2013.01)

(58) Field of Classification Search
None
See application file for complete search history.

(56) References Cited

U.S. PATENT DOCUMENTS

| | | | |
|---|---|---|---|
| 8,817,802 B2 * | 8/2014 | Davis | H04L 1/0003 370/320 |
| 9,998,221 B2 | 6/2018 | Boroson et al. | |
| 10,003,402 B2 | 6/2018 | Boroson et al. | |
| 10,205,521 B2 | 2/2019 | Boroson et al. | |
| 10,680,712 B2 | 6/2020 | Boroson et al. | |
| 11,012,190 B2 * | 5/2021 | Yu | H04L 1/0083 |
| 11,165,504 B2 * | 11/2021 | Huang | H04B 10/516 |
| 11,581,984 B2 | 2/2023 | Kutz et al. | |

OTHER PUBLICATIONS

Zhang et al., Soft Iterative Decoding Algorithms for Rateless Codes in Satellite System, 2019 (Year: 2019).*
Takemoto et al., A Study of Optical Satellite Communication Systems Employing Rate-Adaptive Forward Error Correction, 2015 (Year: 2015).*

(Continued)

*Primary Examiner* — Jai M Lee
(74) *Attorney, Agent, or Firm* — Edlavitch Law PLLC

(57) ABSTRACT

Described herein are techniques for using forward error correction (FEC) and physical layer rateless codec (PLRC) technology to increase the throughput of optical communications. The techniques can be used to increase the throughput of optical communications over a wide range of binary and noisy channels. The techniques can be integrated into satellite communications (SATCOM) modem technologies. As such, the techniques can provide channel coding and FEC for reliable transmission of information between a transmitter and receiver in a wireless or satellite channel, such as a channel for free space optical communications. The techniques can provide higher data communication rates than the state of the art. The input and output signals of a modem implementing the techniques can be communicated at ten thousand or greater optical communications terminal (OCT) frames per ten milliseconds or at least one million OCT frames per second while maintaining reliability.

20 Claims, 11 Drawing Sheets

(56) References Cited

OTHER PUBLICATIONS

Saiki et al., Application of Spinal Code for Performance Improvement in Free-Space Optical Communications, 2016 (Year: 2016).*

A. Rajanna, C. Okino, and K. Andrews, Proximity Link Throughput Enhancements via Raptor Code Technology, in Interplanetary Network Progress Report, NASA JPL, vol. 42-224, Feb. 2021, pp. 1-24.

A. Rajanna and M. Haenggi, Enhanced Cellular Coverage and Throughput Using Rateless Codes, IEEE Transactions on Communications, vol. 65, No. 5, pp. 1899-1912, May 2017.

A. Rajanna and C. Dettmann, Rate Statistics in Cellular Downlink: A Per-User Analysis of Rateless Coded Transmission, IEEE Communications Letters, vol. 24, No. 6, pp. 1221-1225, Jun. 2020.

A. Rajanna and C. Dettmann, Adaptive Transmission in Cellular Networks: Fixed-Rate Codes with Power Control vs Physical Layer Rateless Codes, IEEE Trans. on Wireless Communications, vol. 18, No. 6, pp. 3005-3018, Jun. 2019.

G. Kutz, A. B.-O. Tillinger, T. Oved, S. Landis, O. Amrani, and A. Touboul, Winning by Successive Failures—Enhanced Link Adaptation for Cellular Networks, IEEE Communications Letters, vol. 27, No. 7, pp. 1904-1908, Jul. 2023.

* cited by examiner

400

402 converting, a first converter of a transmitter module of a modem, data carried in a first type of data link layer protocol data unit to data carried in a second type of data link layer protocol data unit

404 encoding, by a forward error correction encoder of the transmitter module, the converted data (which is converted by the first converter), using a forward error correction encoding process, wherein the encoding of the data is rateless

406 modulating, by a modulator of the transmitter module, the encoded data to generate an output signal

408 demodulating, by a demodulator of a receiver module of the modem, an input signal to generate demodulated data

410 decoding, by a forward error correction decoder of the receiver module, the demodulated data using a second forward error correction decoding process, wherein an output of the forward error correction decoder includes data carried in the second type of data link layer protocol data unit, and wherein the decoding of the data is rateless

412 converting, by a second converter of the receiver module, the decoded data (carried in the second type of data link layer protocol data unit) to data carried in the first type of data link layer protocol data unit

414 the receiver module provides feedback to the modulator or the encoder of the transmitter module according to the output of the decoder or the FEC decoding process

FIG. 4

Link Adaptation – PLRC Technology

* 1 OCT Frame = 4712 or 9500 info bits.
* Code Rates are determined on-the-fly for each OCT frame.
* Post FEC and Modulation: 1 OCT Frame ≈ 10K code bits (approximation for below table).

| Baud Rates | # of OCT frames / sec | # of OCT frames / 10 ms |
|---|---|---|
| 2.5 G | 2.5*10^5 | 2.5*10^3 |
| 10 G | 10*10^5 | 10*10^3 |
| 20 G | 20*10^5 | 20*10^3 |
| 30 G | 30*10^5 | 30*10^3 |
| 40 G | 40*10^5 | 40*10^3 |
| 50 G | 50*10^5 | 50*10^3 |

Common Baud Rates for Quasi-Static Fiber Optic Channel

* OCT to follow '$C_t$ – Achievable Rate' by using Optimal MCS per OCT frame enabled by PLRC Technology.
* PLRC technology enables $\frac{K}{N_t} < C_t$ per OCT frame.
* $SNR = \frac{P}{N_0 W}$ is captured in $C_t$.

FIG. 11

OPTICAL COMMUNICATION SYSTEMS USING PHYSICAL LAYER RATELESS CODEC TECHNOLOGY FOR FORWARD ERROR CORRECTION

TECHNICAL FIELD

The present disclosure relates to methods and systems using forward error correction (FEC) and physical layer rateless codec (PLRC) technology to increase the throughput of optical communications.

BACKGROUND

Rateless codes being a new class of variable-length codes have the innate property to adapt both the parity bit construction and the number of parity bits in response to the time-varying channel conditions. Technologies have already started to leverage such a property in rateless codes to handle variable code rates. In some technologies, the parity symbols for an encoded message block can be incrementally transmitted until the receiver decoding succeeds. As such, each message block (or frame) has the potential for a variable amount of coding resulting in a variable code rate. E.g., see the techniques using rateless codes described in "Proximity Link Throughput Enhancements via Raptor Code Technology", authored by Amogh Rajanna, Clay Okino, and Ken Andrews, and published in Interplanetary Network Progress Report, NASA JPL, vol. 42-224, February 2021, pp. 1-24, which are incorporated by reference herein.

Another property of rateless codes is the ability to provide error correction over a wide range of binary and noisy channels. In some technologies, a stochastic geometry model can be used to increase the throughput of cellular communications in noisy channels through rateless codes opposed to fixed-rate codes. E.g., see the techniques using rateless codes described in "Enhanced Cellular Coverage and Throughput Using Rateless Codes", authored by Amogh Rajanna and Martin Haenggi, and published in IEEE Transactions on Communications, vol. 65, no. 5, pp. 1899-1912, May 2017, which are incorporated by reference herein. In some technologies, a stochastic geometry model for the location of base stations can be used to increase the throughput of cellular communications in noisy channels through physical layer rateless codes relative to fixed-rate adaptive modulation and coding. E.g., see the techniques using rateless codes described in "Rate Statistics in Cellular Downlink: A Per-User Analysis of Rateless Coded Transmission", authored by Amogh Rajanna and Carl P. Dettmann, and published in IEEE Communications Letters, vol. 24, no. 6, pp. 1221-1225, June 2020, which are incorporated by reference herein.

As mentioned, rateless codes provide error correction over a wide range of binary and noisy channels. And, it is also important to consider that the current state-of-the-art communication systems for satellite communications (SATCOM) do not use rateless codes, and thus, cannot provide efficient enough error correction for a high baud rate over a wide range of binary and noisy channels. And, current link adaptation schemes using the current state-of-the-art techniques are not robust enough since they do not track the channel variations in between periodic pilots. For example, the state-of-the-art link adaptation algorithms in 5G NR standard or Space Development Agency OCT standard use 5G NR LDPC codes that are not efficient or effective enough to support a high baud rate over a wide range of binary and noisy channels since the codes used are not rateless and channel variations in between the periodic pilots are not tracked. Also, the modulation and coding scheme (MCS) associated such standards is closely matched to the channel only when the transmitter knows the channel state information (CSI). In 5G NTN networks, the satellite transmits periodic pilots to facilitate the MCS adaptation, but the periodic pilots are not tracked and used with rateless codes to enhance baud rate capabilities of the communications systems. And, partially due to such limitations, large scale fading, small scale fading, and interference lead to variations in signal strength in a current 5G wireless or satellite channel.

SUMMARY

Described herein are techniques for using forward error correction (FEC) and physical layer rateless codec (PLRC) implemented technology to increase the throughput of optical communications (also referred to herein as "PLRC technology" or "PLRC"). And, specifically, described herein are techniques for using FEC and PLRC technology to increase the throughput of optical communications over a wide range of binary and noisy channels.

In some embodiments, the techniques for using FEC and PLRC technology to increase the throughput of optical communications over a wide range of binary and noisy channels can be integrated into satellite communications (SATCOM) modem technologies. As such, the techniques can provide channel coding and FEC for reliable transmission of information between a transmitter and receiver in a wireless or satellite channel, such as a channel for free space optical communications. Also, the techniques can provide higher data communication rates than the state of the art. For example, The input signal and the output signal of a modem implementing the techniques can be communicated at ten thousand or greater optical communications terminal (OCT) frames per ten milliseconds or at least one million OCT frames per second while maintaining reliability of the signals.

The techniques disclosed herein provide specific technical solutions to at least overcome the technical problems related to optical communications, especially when the communications include communications in a free space over a wide range of binary and noisy channels. Also, the disclosed herein provide specific technical solutions to at least overcome the technical problems mentioned in the background section or other parts of the application as well as other technical problems not described herein but recognized by those skilled in the art.

Some embodiments include a system, having a transmitter module, configured to generate an output signal for transmission through electromagnetic radiation. The transmitter module includes a first converter, configured to convert data carried in a first type of data link layer protocol data unit to data carried in a second type of data link layer protocol data unit. In some examples, the first converter is configured to convert data carried in Ethernet frames to data carried in Free Space Optical (FSO) frames. The transmitter module also includes a forward error correction encoder (which is a part of a PLRC), configured to encode the converted data (which is converted by the first converter), using a forward error correction encoding process, wherein the encoding of the data is rateless. The transmitter module also includes a modulator, configured to modulate the encoded data to generate the output signal.

Furthermore, the system includes a receiver module, configured to generate data carried in the first type of data link layer protocol data unit from an input signal received through electromagnetic radiation. The receiver module includes a demodulator, configured to demodulate the input signal to generate demodulated data. The receiver module also includes a forward error correction decoder (which is a part of the PLRC), configured to decode the demodulated data using a second forward error correction decoding process, wherein an output of the forward error correction decoder comprises data carried in the second type of data link layer protocol data unit, and wherein the decoding of the data is rateless. The receiver module also includes a second converter, configured to convert the decoded data (carried in the second type of data link layer protocol data unit) to data carried in the first type of data link layer protocol data unit. In some examples, the second converter is configured to convert the decoded data (which is carried in FSO frames) to data carried in Ethernet frames. With respect to the system, the input signal is received through a laser beam and the output signal is transmitted through a laser beam. And, the input signal and the output signal are communicated at ten thousand or greater optical communications terminal (OCT) frames per ten milliseconds or at least one million OCT frames per second.

With respect to some embodiments, disclosed herein are computerized methods using FEC and PLRC technology to increase the throughput of optical communications, in general, and in a free space over a wide range of binary and noisy channels, for example. Also, with respect to some examples, disclosed herein are examples of a non-transitory computer-readable storage medium for carrying out technical operations of the computerized methods. The non-transitory computer-readable storage medium has tangibly stored thereon, or tangibly encoded thereon, computer-readable instructions that when executed by one or more devices cause at least one processor to perform a method for improved systems and methods for using FEC and PLRC technology to increase the throughput of optical communications.

These and other important aspects of the invention are described more fully in the detailed description below. The invention is not limited to the particular methods and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

FIG. 4 illustrates a method performable by a modem having a reconfigurable optical transmitter and a reconfigurable optical receiver of the PLRC (such as one of the modems of the network shown in FIG. 1 or in FIG. 2), in accordance with some embodiments of the present disclosure.

FIGS. 10 and 11 illustrate example benefits of the PLRC technologies and the enhanced operations shown in FIGS. 8 and 9, in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

Described herein are techniques for using forward error correction (FEC) and physical layer rateless codec (PLRC) technology to increase the throughput of optical communications (also referred to herein as "PLRC technology" or "PLRC"). And, specifically, described herein are techniques for using FEC and PLRC technology to increase the throughput of optical communications over a wide range of binary and noisy channels.

In some embodiments, the techniques for using FEC and PLRC technology to increase the throughput of optical communications over a wide range of binary and noisy channels can be integrated into satellite communications (SATCOM) modem technologies. As such, the techniques can provide channel coding and FEC for reliable transmission of information between a transmitter and receiver in a wireless or satellite channel, such as a channel for free space optical communications. Also, the techniques can provide higher data communication rates than the state of the art. For example, The input signal and the output signal of a modem implementing the techniques can be communicated at ten thousand or greater optical communications terminal (OCT) frames per ten milliseconds or at least one million OCT frames per second while maintaining reliability of the signals.

Figure 1:
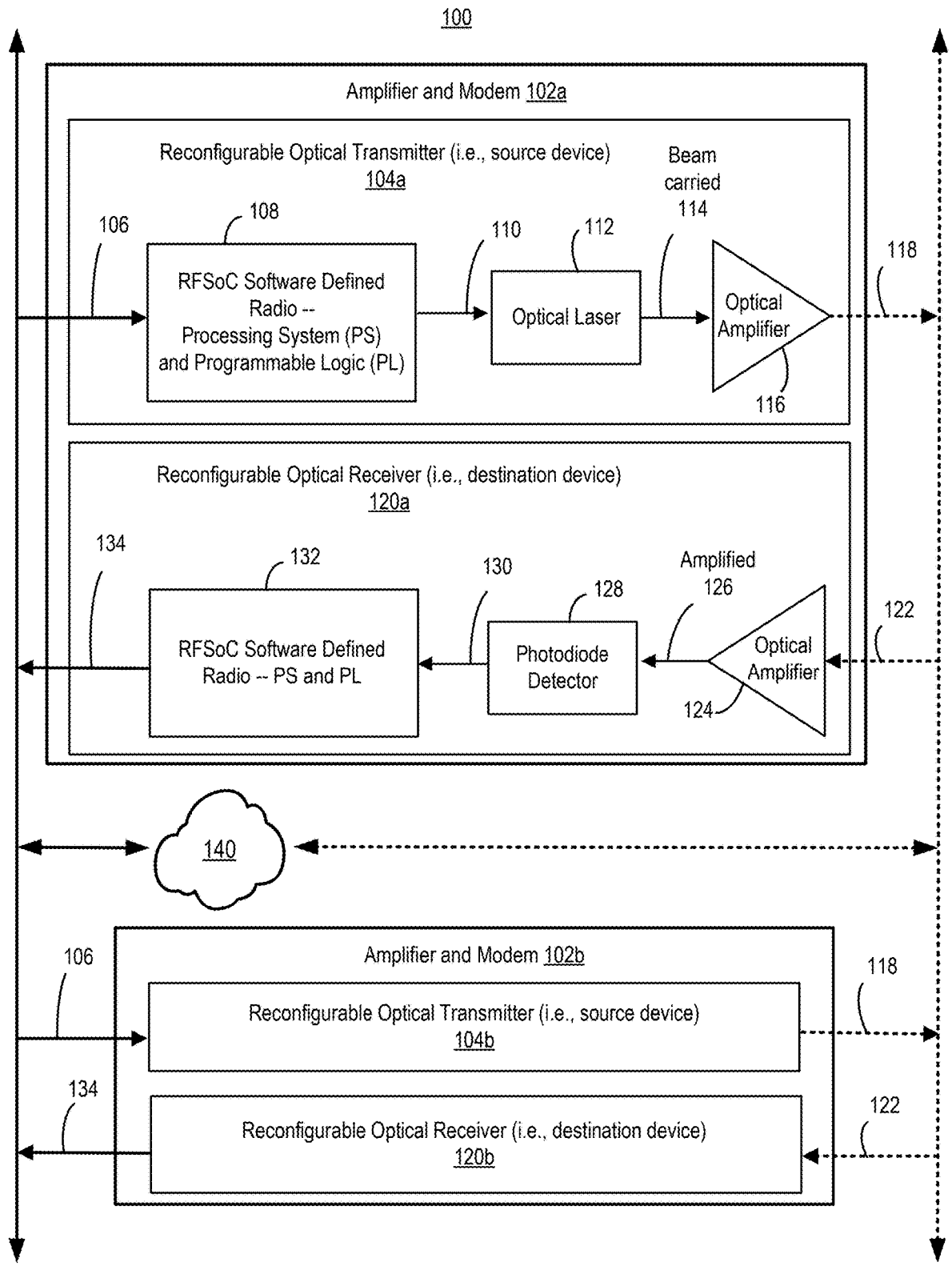
FIG. 1 illustrates an example technical solution to the example technical problems described herein including a network having modems wherein at least some of the modems of the network each have a respective reconfigurable optical transmitter and a respective reconfigurable optical receiver that can implement aspects of the physical layer rateless codec (PLRC), in accordance with some embodiments of the present disclosure.

FIG. 1 illustrates an example technical solution to the example technical problems described herein including a network 100 having modems (e.g., see amplifiers and modems 102a and 102b) wherein at least some of the modems of the network each have a respective reconfigurable optical transmitter and a respective reconfigurable optical receiver that can implement aspects of the PLRC (e.g., see transmitters and receivers 104a, 120a, 104b, and 120b), in accordance with some embodiments of the present disclosure. The illustrated technical solution of FIG. 1 and other solutions described herein at least overcomes the technical problems related to optical communications described herein, especially when the communications include communications in a free space over a wide range of binary and noisy channels. Also, the technical solution of FIG. 1 and other solutions described herein at least overcomes the technical problems mentioned in the background section or other parts of the application as well as other technical problems not described herein but recognized by those skilled in the art.

As shown in FIG. 1, the network 100 includes at least amplifiers and modems 102a and 102b. Amplifier and modem 102a includes a reconfigurable optical transmitter 104a. And, modem 102b includes a reconfigurable optical transmitter 104b. The reconfigurable optical transmitter 104a or 104b can be considered a source device since it is a source of optical signals of the network 100. The channel of the optical signals for network 100 is depicted as a dashed line and the amplifiers and modems 102a and 102b communicate through the channel optically. Whereas, the channel of the electrical signals for network 100 is depicted as a solid line and the amplifiers and modems 102a and 102b communicate through the channel electrically. As shown, the reconfigurable optical transmitter 104a includes an electrical signal input 106 that is processed by a Radio Frequency System-on-Chip (RFSoC) software defined radio. An electrical signal output 110 of the RFSoC software defined radio is in turn the input of an optical laser 112 of the transmitter 104a that transforms the electrical signal into a corresponding optical signal 114. The transmitter 104a also includes an optical amplifier 116 that amplifies the optical signal 114 so that it can be effectively communicated over the optical channel of the network 100 as the amplified optical signal 118. The reconfigurable optical transmitter 104b can include similar parts to that of reconfigurable optical transmitter 104a.

Also, the amplifier and modem 102a includes a reconfigurable optical receiver 120a. And, modem 102b includes a reconfigurable optical receiver 120b. The reconfigurable optical receiver 120a or 120b can be considered a destination device since it is a destination of optical signals of the network 100. Again, the channel of the optical signals for network 100 is depicted as a dashed line and the amplifiers and modems 102a and 102b communicate through the channel optically. Whereas, the channel of the electrical signals for network 100 is depicted as a solid line and the amplifiers and modems 102a and 102b communicate through the channel electrically. As shown, the reconfigurable optical receiver 120a includes an optical signal input 122 that is received by an optical amplifier 124 of the receiver 120a. The amplifier 124 amplifies the optical signal input 122 to produce an amplified optical signal 126 that is received by the photodiode detector 128 of the receiver 120a. The detector 128 transforms the optical signal into an electrical signal which is the is the electrical signal input 130 for the RFSoC software device radio 132 of the receiver 120a. The input 130 is processed by the RFSoC software device radio 132 to generate an electrical signal output 134 of the RFSoC software defined radio. The electrical signal output 134 is effectively communicated over the electrical channel of the network 100. The reconfigurable optical receiver 120b can include similar parts to that of reconfigurable optical receiver 120a. Also, in some examples, the RFSoC software defined radios 108 and 120 can be the same radio or can at least by on the same chip.

Also, as shown in FIG. 1, the network 100 includes one or more LAN/WAN networks 140 which is shown communicatively coupling the modems of the amplifiers and modems 102a and 102b and can couple other modems and network devices of the network 100, such as through the electrical channel or the optical channel depicted in FIG. 1. The LAN/WAN network(s) 140 can include one or more local area networks (LAN(s)) or one or more wide area networks (WAN(s)). The LAN/WAN network(s) 140 can include the Internet or any other type of interconnected communications network. The LAN/WAN network(s) 140 can also include a single computer network or a telecommunications network. More specifically, the LAN/WAN network(s) 140 can include a local area network (LAN) such as a private computer network that connects computers in small physical areas, a wide area network (WAN) to connect computers located in different geographical locations, or a metropolitan area network (MAN)—also known as a middle area network—to connect computers in a geographic area larger than that covered by a large LAN but smaller than the area covered by a WAN.

At least each component shown of the network 100 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

As mentioned, with respect to some embodiments, disclosed herein are computerized methods using FEC and PLRC technology to increase the throughput of optical communications, in general, and in a free space over a wide range of binary and noisy channels, for example. Also, with respect to some examples, disclosed herein are examples of a non-transitory computer-readable storage medium for carrying out technical operations of the computerized methods. The non-transitory computer-readable storage medium has tangibly stored thereon, or tangibly encoded thereon, computer-readable instructions that when executed by one or more devices cause at least one processor to perform a method for improved systems and methods for using FEC and PLRC technology to increase the throughput of optical communications.

Figure 2:
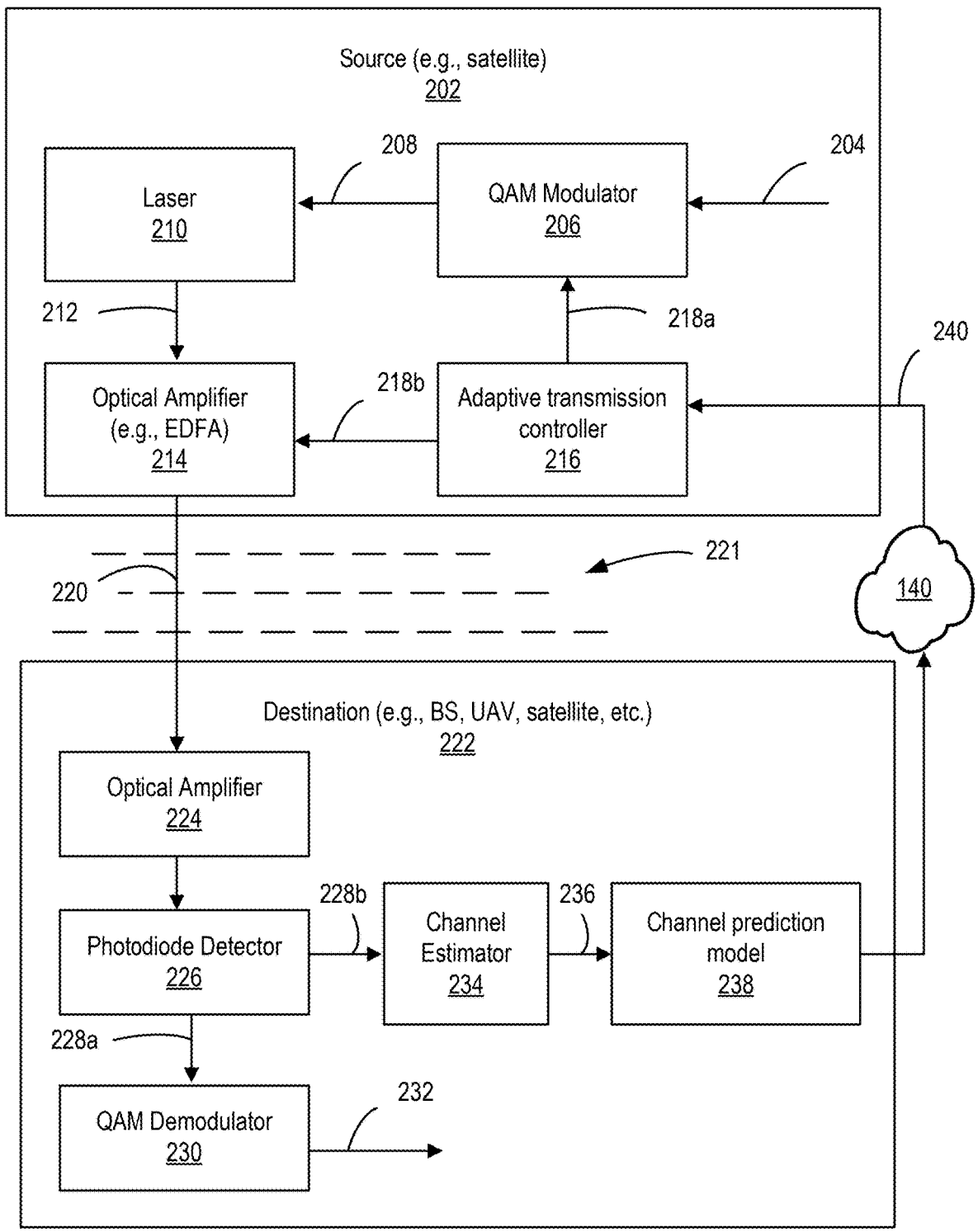
FIG. 2 illustrates an example implementation of the example technical solution shown in FIG. 1 wherein at least some of the modems of the network use satellite communications (SATCOM) modem technologies, in accordance with some embodiments of the present disclosure.

FIG. 2 illustrates an example implementation of the example technical solution shown in FIG. 1 wherein at least some of the modems of the network 200 (which can be or be a part of network 100) use satellite communications (SATCOM) modem technologies, in accordance with some embodiments of the present disclosure. In some embodiments, the techniques for using FEC and PLRC technology to increase the throughput of optical communications over a wide range of binary and noisy channels can be integrated into satellite communications (SATCOM) modem technologies, such as the technologies illustrated in FIG. 2 and used by network 200. As such, the techniques can provide channel coding and forward error correction for reliable transmission of information between a transmitter and receiver in a wireless or satellite channel, such as a channel for free space optical communications. The techniques can increase throughput, coverage, bandwidth gains, and energy usage efficiency over the current state of the art for providing channel coding and forward error correction in communications in a free space. Systems using the techniques can include waveform processing modules that can be reconfigurable modem blocks for SATCOM or other forms of free space communications (such as free space optical communications).

As shown in FIG. 2, a source device 202 (such as a satellite in general, or specifically an low earth orbit (LEO) satellite) can include an input signal 204 (which can be electrical or optical) that can be modulated by a quadrature amplitude modulation (QAM) modulator 206 of the source device to provide a modulated signal to a laser 210 of the source device. The laser 210 of the source device 202 can produce a laser beam signal 212 that can be amplified by optical amplifier 214 of the source device 202. The optical amplifier 214 and the QAM modulator can be controlled by an adaptive transmission controller 216 (e.g., FEC HARQ mechanism or FEC hybrid automatic repeat request mechanism) of the source device 202 via a control signal 218b. The control signal 218b can be an electrical signal or an optical signal depending on the embodiment. In some cases, as shown in the FIG. 2, the optical amplifier can be or include or be a part of an erbium-doped fiber amplifier (EDFA). The optical output signal 220 of the amplifier 214 is a free space optical communications signal. And, since the signal 220 is such a signal it can experience turbulence 221 and other conditions in space or air that cause noise to obfuscate the signal.

Also, as shown in FIG. 2, a destination device 222 (such as another satellite, a base station, a vehicle such as an unmanned aerial vehicle, a ground station, a remote SATCOM terminal, etc.) receives the optical output signal 220 from the source device 202 via space or air and, thus, the signal received is obfuscated with noise. The obfuscation of the signal can be reduced by an optical amplifier 224 of the destination device 222 through optical signal amplification. The amplified signal can then be received by a photodiode detector 226 of the destination device 222. The detector 226 can transform the amplified signal into a corresponding electrical signals 228a and 228b, which can be the same signal depending on the embodiment. The electrical signals 228a and 228b are then received by a QAM demodulator 230 and a channel estimator 234 (e.g., FEC decoder) of the destination device 222.

The QAM demodulator 230 of the destination device demodulates the signal 228a and provides a demodulated signal 232 to other parts of the destination device 222 (the other parts not depicted in FIG. 2). The channel estimator 234 of the destination device (which can be a part of any one of the decoders mentioned herein) decodes the signal 228b and provides parameters of the channel for the optical communications between the source device 202 and the destination device 204. The decoded signal 236 can include the parameters of the channel provided by the estimator 234 and can be an input signal for a channel prediction model 238 (which can provide or use ARQ feedback) that can enhance the decoded signal and the provide the enhanced signal 240 (e.g., HARQ or hybrid automatic retransmission request) as feedback to the adaptive transmission controller 216 of the source device 202, such as via LAN/WAN network(s) 140. Then, in turn, the adaptive transmission controller 216 can enhance the signals 218a and 218b according to the enhance signal 240 such that the signals 218a and 218b are enhanced to improve the performance of the amplifier 214 and QAM modulator 206 of the source device. And, therefore, the feedback from the enhanced signal 240 can improve the transmission of the optical output signal 220 to be better adapted to the turbulence 221 and other conditions in space or air that cause noise to obfuscate the signal 220 from the source device and transmitted to the destination device. The aforementioned components of the source device 202 and the destination device 222 can implement, at least partially, the PLRC technologies to increase the baud rate capabilities of the respective modems of the source device and the destination device.

Figure 3:
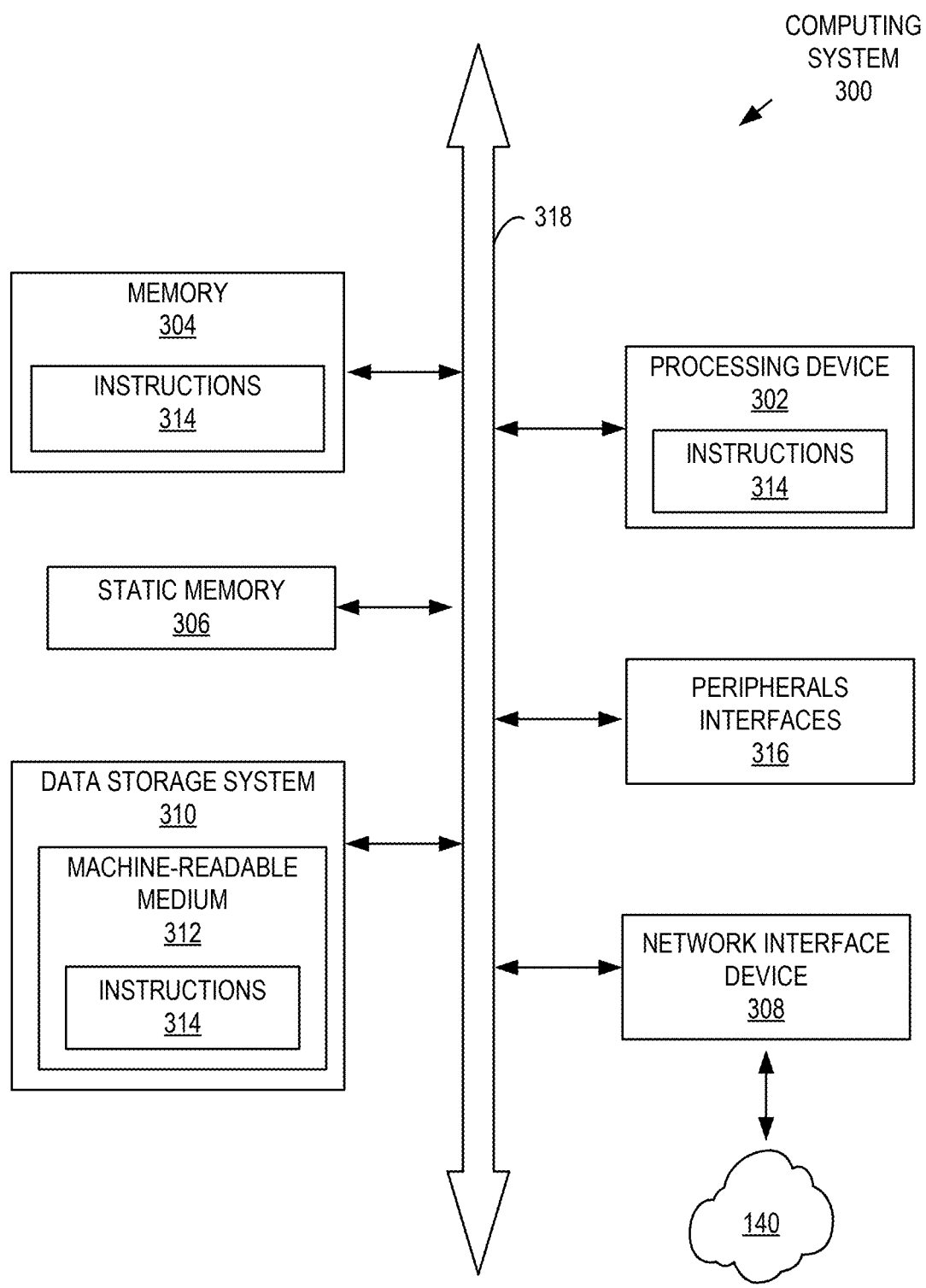
FIG. 3 illustrates a block diagram of example aspects of a computing system of a modem of the network shown in FIG. 1 or FIG. 2, in accordance with some embodiments of the present disclosure.

FIG. 3 illustrates a block diagram of example aspects of a computing system 300 of a modem of the network 100 shown in FIG. 1 or network 200 shown in FIG. 2, in accordance with some embodiments of the present disclosure. Also, FIG. 3 illustrates parts of the computing system 300 within which a set of instructions are executed for causing a machine (such as a computer processor or processing device 302) to perform any one or more of the methodologies discussed herein that can be performed by a computing system (e.g., see the method steps of the method 400 as well as the operations shown in FIGS. 7, 8, and 9). In some embodiments, the computing system 300 operates with additional computing systems to provide increased computing capacity in which multiple computing systems operate together to perform any one or more of the methodologies discussed herein that are performed by a computing system.

In some embodiments, the computing system 300 corresponds to a host system that includes, is coupled to, or utilizes memory or is used to perform the operations performed by any one of the computing systems described herein. In some embodiments, the machine is connected (e.g., networked) to other machines in a LAN, an intranet, an extranet, or the Internet. In some embodiments, the machine operates in the capacity of a server in a client-server network environment, as a peer machine in a peer-to-peer (or distributed) network environment, or as a server in a cloud computing infrastructure or environment. In some embodiments, the machine is any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by computing systems.

The computing system 300 includes a processing device 302, a main memory 304 (e.g., read-only memory (ROM), flash memory, dynamic random-access memory (DRAM), etc.), a static memory 306 (e.g., flash memory, static random-access memory (SRAM), etc.), and a data storage system 310, which communicate with each other via a bus 318. The processing device 302 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 302 is one or more special-purpose processing devices such as an application-specific integrated circuit (ASIC), a field programmable gate array (FPGA), a digital signal processor (DSP), a network processor, or the like. The processing device 302 is configured to execute instructions 314 for performing the operations discussed herein performed by a computing system. In some embodiments, the computing system 300 includes a network interface device 308 to communicate over a communications network. Such a communications network can include one or more local area networks (LAN(s)) and/or one or more wide area networks (WAN(s)) 140 shown in FIG. 1. In some embodiments, the communications network includes the Internet and/or any other type of interconnected communications network. The communications network can also include a single computer network or a telecommunications network.

The data storage system 310 includes a machine-readable storage medium 312 (also known as a computer-readable medium) on which is stored one or more sets of instructions 314 or software embodying any one or more of the methodologies or functions described herein performed by a computing system. The instructions 314 also reside, completely or at least partially, within the main memory 304 or within the processing device 302 during execution thereof by the computing system 300, the main memory 304 and the processing device 302 also constituting machine-readable storage media. While the machine-readable storage medium 312 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure performed by a computing system. The term "machine-readable storage medium" shall accordingly be taken to include solid-state memories, optical media, or magnetic media.

Also, as shown, the computing system 300 includes peripheral interfaces 316 (which can include interfaces for a display and other types of user-interface devices, as well as interfaces for various types of sensors, controllers, and any other type of hardware that interacts with a computing system), and, for example, the peripheral interfaces 316 can implement at least partially any functionality corresponding to any one of the user-interface devices, sensors, or controllers disclosed herein.

FIG. 4 illustrates a method 400 performable by a modem having a reconfigurable optical transmitter and a reconfigurable optical receiver of the PLRC (such as one of the modems of the network shown in FIG. 1 or in FIG. 2), in accordance with some embodiments of the present disclosure. In some embodiments, the method can be executed by any one of the computing systems described herein (e.g., see computing system 300 depicted in FIG. 3). In some systems of the technologies disclosed herein, any steps of embodiments of the methods described herein (such as method 400) are implementable by executing instructions corresponding to the steps, which are stored in memory (such as the instructions 314 of system 300).

As shown in FIG. 4, method 400 begins with step 402, which includes a first converter of a transmitter module of a modem converting data carried in a first type of data link layer protocol data unit (such as data carried in Ethernet frames) to data carried in a second type of data link layer protocol data unit (such as data carried in Free Space Optical (FSO) frames). At step 404 of the method, a forward error correction encoder of the transmitter module encodes the converted data (which is converted by the first converter) using a forward error correction encoding process. In step 404, the encoding of the data is rateless (e.g., rateless in that the encoding is at least based on physical layer rateless codes). At step 406 of the method, a modulator modulates the encoded data to generate an output signal. At step 408 of the method, a demodulator of a receiver module of the modem demodulates an input signal to generate demodulated data. At step 410 of the method, a forward error correction decoder of the receiver module decodes the demodulated data using a second forward error correction decoding process. In step 410, an output of the forward error correction decoder includes data carried in the second type of data link layer protocol data unit and the decoding of the data is rateless. At step 412 of the method, a second converter of the receiver module, converts the decoded data (carried in the second type of data link layer protocol data unit) to data carried in the first type of data link layer protocol data unit. In some embodiments, the input signal is received through a laser beam and the output signal is transmitted through a laser beam. And, in some cases, the input signal and the output signal are communicated at ten thousand or greater optical communications terminal (OCT) frames per ten milliseconds or at least one million OCT frames per second.

Also, as shown in FIG. 4, the method 400 includes, at step 414, the receiver module providing feedback to the modulator or the encoder of the transmitter module according to the output of the decoder or the FEC decoding process. In some embodiments, where the optical communications are SATCOM communications, the decoded signal provided by step 410 can include signal 236 that can include the parameters of the channel provided by the estimator 234 and can be an input signal for a channel prediction model 238 that can enhance the decoded signal and the provide the enhanced signal 240 as feedback to the adaptive transmission controller 216 of the source device 202, such as via LAN/WAN network(s) 140, at step 414. Then, in turn, the adaptive transmission controller 216 can enhance the signals 218a and 218b according to the enhance signal 240 such that the signals 218a and 218b are enhanced to improve the performance of the amplifier 214 and QAM modulator 206 of the source device (e.g., see the relationship between step 414 and steps 404 and 406, wherein the feedback is provided to the encoder and the modulator to enhance the outputs of the encoder and the modulator). And, therefore, the feedback provide in step 414, such as being from the enhanced signal 240 of the destination device shown in FIG. 2, can improve the transmission of the optical output signal 220 to be better adapted to the turbulence 221 and other conditions in space or air that cause noise to obfuscate the signal 220 from the source device and transmitted to the destination device. The aforementioned components of the source device 202 and the destination device 222 (analogous to the transmitter module and receiver module described with respect to the method 400) can implement, at least partially, the PLRC technologies to increase the baud rate capabilities of the respective modems of the source device and the destination device.

Figure 5:
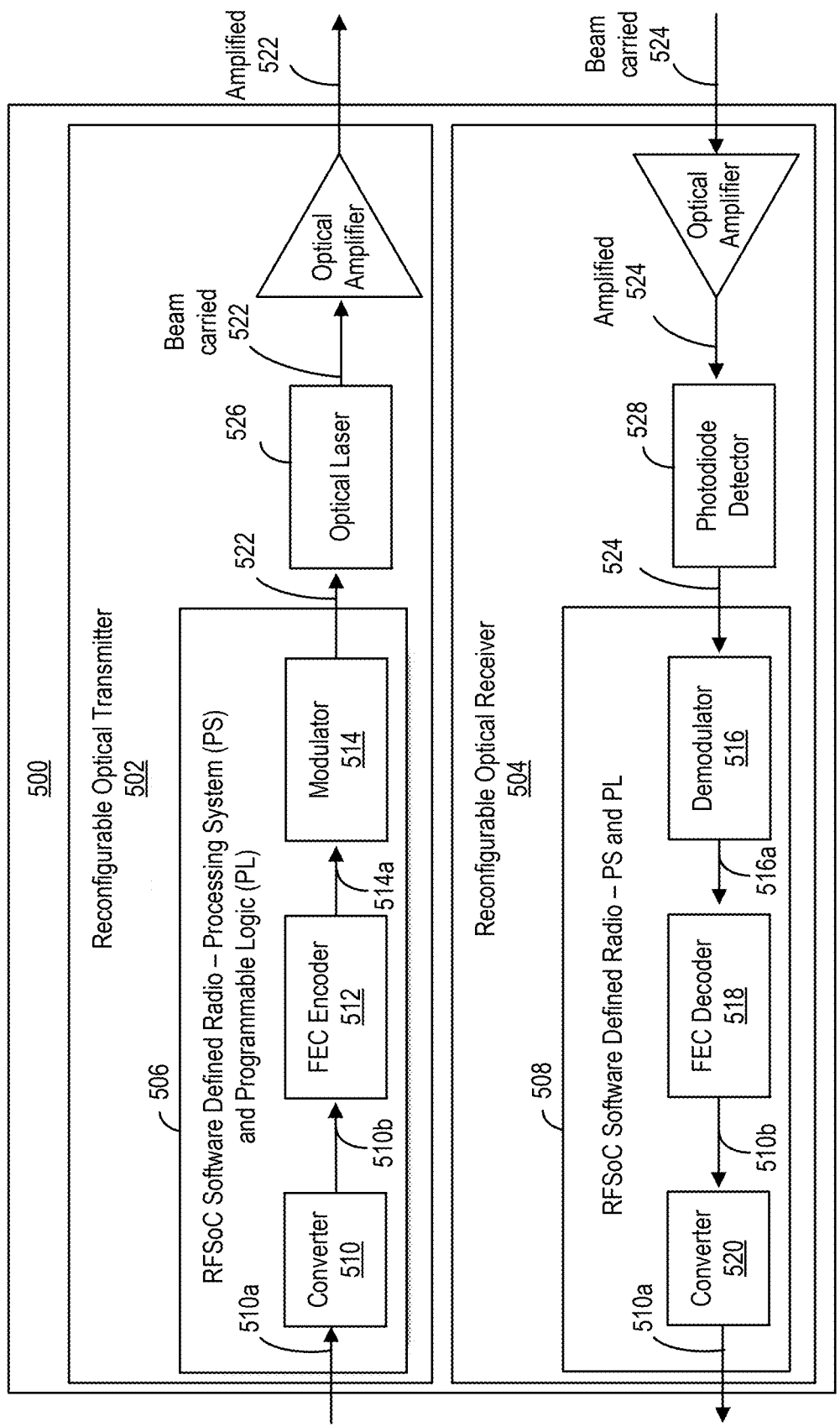
FIG. 5 illustrates a modem having a reconfigurable optical transmitter and a reconfigurable optical receiver that can implement aspects of the PLRC (such as one of the modems of the network shown in FIG. 1 or in FIG. 2), in accordance with some embodiments of the present disclosure.

FIG. 5 illustrates a modem 500 having a reconfigurable optical transmitter 502 and a reconfigurable optical receiver 504 that can implement aspects of the PLRC (such as one of the modems of the network shown in FIG. 1 or in FIG. 2), in accordance with some embodiments of the present disclosure. In some examples, the modem 500 is or includes or is a part of a SATCOM modem and each of the transmitter and receiver include reconfigurable modem blocks for SATCOM. In some embodiments, as shown in FIG. 5, the reconfigurable modem blocks include transmitter modem blocks and receiver modem blocks (e.g., see modem blocks 506 and receiver modem blocks 508). In some examples, the modem 500 is configured for communications of low earth orbit (LEO) satellite constellations (such as communications of proliferated low earth orbit (pLEO) constellations).

In some embodiments, the transmitter module and the receiver module of the system (e.g., see blocks 506 and 508) are part of a software-defined radio (SDR) and reconfigurable via software changes. In some cases, the blocks 506 of the reconfigurable optical transmitter 502 can be an SDR, e.g., as shown in FIG. 5. Also, the blocks 508 of the reconfigurable optical receiver 504 can be an SDR, e.g., as shown in FIG. 5.

In some examples, the blocks 506 of the reconfigurable optical transmitter 502, the blocks 508 of the reconfigurable optical receiver 504, or a combination thereof can be integrated into a single chip (as shown in FIG. 5). Such a single chip can include integrated digital-to-analog converter (DAC) and analog-to-digital converter (ADC) cores. Such a single chip can include Radio Frequency System-on-Chip (RFSoC) architecture, as shown. The blocks combined together, or separately, can be part of a RFSoC single chip device. The device (whether for one or both blocks) can be a single chip that includes DAC and ADC cores. Also, as shown, each of the blocks 506 and 508 can include RFSoC defined radio that includes a processing system (PS) and programmable logic (PL). In some embodiments, the transmitter module and the receiver module (e.g., see blocks 506 and receiver 508) are implemented on a single printed circuit board.

In some embodiments, the single chip can include a system-on-chip architecture that includes a set of application processors with each application processor including a reduced instruction set computing architecture and a set of real-time processor with each real-time processor including a reduced instruction set computing architecture as well that is integrated into the PL. The PL can be implemented with FPGA gates (e.g., 80K or more FPGA gates). The RFSoC architecture can provide 64-bit processor scalability while combining real-time control with soft and hard engines for waveform and packet processing. In examples having the DAC and ADC cores (in contrast to prior designs with separate chips or ICs for ADC DAC processing, satellite vendors can benefit from the higher level of integration in RFSoCs due to the smaller PCB footprint and reduced overall power consumption. Furthermore, in some embodiments, computing operating systems (such as UNIX or a UNIX-like OS, e.g., LINUX) can be integrated through drivers running the cores (which provides for control and monitoring capabilities for a chip). In such examples, such as shown in FIG. 5, Ethernet packets can be converted to free space optical (FSO) frames and vice versa via the blocks 506 and 508, respectively. The single chip or RFSoC device can provide a baseband or L-band output with a PLRC waveform. In some examples, the Gbps rates of the transmitter will be higher than the receiver Gbps rates.

In some examples, such as the modem 500, the reconfigurable optical transmitter 502 is configured to generate an output signal for transmission through electromagnetic radiation, e.g., infrared wavelength (e.g., see output signal 522). The reconfigurable optical transmitter 502 includes a first converter 510, configured to convert data carried in a first type of data link layer protocol data unit 510a to data carried in a second type of data link layer protocol data unit 510b. In some embodiments, the first type of data link layer protocol data unit 510a is an Ethernet frame and the second type of data link layer protocol data unit 510b is a FSO frame. The reconfigurable optical transmitter 502 also includes a forward error correction encoder 512 (which is a part of a PLRC), configured to encode the converted data (which is converted by the first converter), using a forward error correction encoding process, wherein the encoding of the data is rateless. The reconfigurable optical transmitter 502 also includes a modulator 514, configured to modulate the encoded data 514a to generate the output signal. In some embodiments, the forward error correction encoder 512 comprises a physical layer rateless encoder (a part of the PLRC) configured to generate parity bits (e.g., generate an unending number of parity pits) based on source bits and then combine the source bits with the parity bits. In some embodiments, the forward error correction encoder is at least partially implemented by a rateless Luby Transform (LT) for the physical layer, and, in some cases, the forward error correction encoder 512 is further configured to integrate bits encoded by the rateless LT to a symbol mapper, which maps bits to finite constellation Quadrature Amplitude Modulation (QAM) symbols.

In some embodiments, the generation of the parity bits by the physical layer rateless encoder is further based on channel conditions (e.g., instantaneous channel conditions). In some cases, one million or higher OCT frames per second can have an enhanced modulation and coding Scheme (MCS) or coding rate matched to instantaneous channel conditions of networked links (such as either space-to-space (S2S) or space-to-terrestrial (S2T) links). In some cases, the generation of the parity bits by the physical layer rateless encoder is not based on a pre-selected code rate of communications for the PLRC system. For example, in some cases, for each OCT frame with K source bits, the PLRC system can main KNt<Ct, where Nt is the number of parity symbols and Ct is the achievable rate of the channel. In some cases, for each of the one million or higher OCT frames per second, the spectral efficiency (SE) is matched to the channel achievable rate leading to higher SE for high signal-to-noise ratio (SNR) channel conditions and moderate SE for low SNR channel conditions. In some cases, channel impairments for an S2T link includes atmospheric scintillation, pointer jitter and doppler Shifts. Channel Impairments for the S2S link includes pointer jitter and doppler shifts. Such impairments can be reduced and even overcome by the physical layer rateless encoder and the generation and use of the parity bits.

Also, in some examples, such as with the modem 500, the reconfigurable optical receiver 504 is configured to generate data carried in the first type of data link layer protocol data unit from an input signal received through electromagnetic radiation (e.g., see input signal 524). The reconfigurable optical receiver 504 includes a demodulator 516, configured to demodulate the input signal to generate demodulated data 516a. The reconfigurable optical receiver 504 also includes a forward error correction decoder 518 (which is a part of the PLRC), configured to decode the demodulated data using a second forward error correction decoding process, wherein the output of the forward error correction decoder comprises data carried in the second type of data link layer protocol data unit, and wherein the decoding of the data is rateless. The reconfigurable optical receiver 504 also includes a second converter 520, configured to convert the decoded data (carried in the second type of data link layer protocol data unit 510b) to data carried in the first type of data link layer protocol data unit 510a. In some examples, the forward error correction decoder (such as the decoder 518) includes a physical layer rateless decoder (a part of the PLRC) configured to recover source data by accumulating parity bits (e.g., soft parity bits) until a threshold number of parity bits is reached that identifies that the source data is reliably decoded. The physical layer rateless decoder can be configured to decode source data until an acknowledgement is sent in response to either the threshold number being reached (e.g., a successful OCT frame decoding) or a delay constraint being reached.

In some embodiments, the forward error correction decoder (which is a part of the PLRC) comprises a physical layer rateless decoder configured to decode source data by accumulating soft parity bits until the source data is reliably decoded, and, in some examples, the physical layer rateless decoder is configured to send an acknowledgement in response to either a successful OCT frame decoding or a delay constraint being reached. In some embodiments, the forward error correction decoder is configured to track and compare mutual information (MI) between encoder outputs of the forward error correction encoder and decoder inputs of the forward error correction decoder (i.e., output of the demodulator) until the MI comparison exceeds one or more MI thresholds. In some examples, the forward error correction decoder is configured to activate a Luby Transform of the rateless decoder once the MI comparison exceeds one or more MI thresholds. And, in some cases, the forward error correction encoder (such as encoder 512) is configured to adapt a retransmission size based on an accumulated MI value and a distance from a corresponding threshold. In some embodiments, the FEC decoder is configured to activate a Luby Transform decoding of the rateless decoder once the MI comparison exceeds one or more MI thresholds, and, in some examples, the FEC encoder is configured to adapt a retransmission or incremental parity size based on an accumulated MI value and its distance from a corresponding threshold.

In such examples (such as shown in FIG. 5), the input signal is received through a laser beam and the output signal is transmitted through a laser beam. And, some of such embodiments, the input signal and the output signal are communicated at ten thousand or greater optical communications terminal (OCT) frames per ten milliseconds or at least one million OCT frames per second. Or, in terms of communication baud rates, data transmission and reception are at baud rates of 10G or higher, for some examples.

The PLRC technique and FEC is leveraged to enhance aspects of the modem 500, such as for increasing its throughput. However, it is to be understood that the techniques for using FEC and PLRC technology described herein can enhance aspects of other types of modems, routers, and communications network devices, such as for increasing throughput of such devices Also, the techniques described herein using FEC and PLRC technology increase the throughput of optical communications over a wide range of binary and noisy channels in general. One way enhancements are made is by increasing LEO free space optical communication (FSOC) data rates to approach optical fiber communication (OFC) data rates. In some embodiments, target LEO FSOC data rates of at least 10G can be accomplished through the techniques described herein, and can approach rates of 100 to 400 Gbps per wavelength. The includes increasing the data rates of LEO FSOC data links such as LEO inter-satellite links with Doppler shifts, LEO downlink S2T links, and LEO uplink terrestrial-to-space (T2S) links.

With respect to the modem 500 shown in FIG. 5, the input signal 524 and the output signal 522 are communicated via a LEO link between a satellite in low Earth orbit and a ground station. However, it is to be understood that in other examples, the input signal and output signal are communicated via any type of link that is binary and noisy, such as any link type for free space optical communication. For example, the input signal and the output signal data can be communicated via a S2S link, a space-to-air (S2A) link, a space-to-maritime (S2M) link, or a space-to-ground (S2G) link. For instance, the input data and the output data can be communicated via a S2S link between two LEO satellites. Also, in some examples, a S2G link can be between a satellite in low Earth orbit and an aircraft, ship, or ground station. The aforementioned S2G links between a satellite and an aircraft, ship, or ground station are collectively referred to as S2T links.

Returning to FIG. 5, a system of some of the embodiments can include the transmitter 502 or the receiver 504 of the modem 500, or both the transmitter and receiver or the entire modem. And, a system of some of the embodiments can merely include the blocks 506 or blocks 508, or both blocks 506 and 508. In such a system including at least the blocks 506 and 508, the transmitter module (or blocks 506), can be configured to generate output signal 522 for transmission through electromagnetic radiation, and the transmitter module can include a first converter 510, configured to convert data carried in Ethernet frames to data carried in FSO frames. The transmitter module (or blocks 506) can also include a forward error correction encoder 512 (which is a part of a PLRC), configured to encode the converted data (which is converted by the first converter), using a first forward error correction encoding process, and wherein the encoding of the data is rateless. The transmitter module (or blocks 506) can also include a modulator 514, configured to modulate the encoded data to generate the output signal data. Also, in such a system including at least the blocks 506 and 508, the receiver module (or blocks 508), can be configured to generate data carried in Ethernet frames from an input signa received through electromagnetic radiation, and the receiver module can include a demodulator 516, configured to demodulate the input signal input data 524 to generate demodulated data. The receiver module (or blocks 508) can also include a forward error correction decoder 518 (which is a part of the PLRC), configured to decode the demodulated data using a second forward error correction decoding process, and the output of the forward error correction decoder comprises data carried in FSO frames. Also, the decoding of the data is rateless. The receiver module (or blocks 508) can also include a second converter 520, configured to convert the decoded data (which is carried in FSO frames) to data carried in Ethernet frames. In such embodiments, input signal 524 is received through a laser beam and the output signal 522 is transmitted through a laser beam.

And, the input signal and the output signal data can be communicated at ten thousand or greater OCT frames per ten milliseconds.

Additionally, as shown in FIG. 5, some embodiments include an optical laser configured to generate a laser beam that carries the output signal (e.g., see optical laser 526 of the modem 500). Also, as shown, some embodiments include a photodiode detector configured to receive an input signal from a laser beam (e.g., see photodiode detector 528 of the modem 500). Furthermore, as shown in FIG. 5, some embodiments include an optical amplifier for the transmitter (e.g., see amplifier 530) configured to amplify the output signal 522. And, as shown, some embodiments include an optical amplifier for the receiver (e.g., see amplifier 532) configured to amplify the input signal 524.

In some embodiments, the modem 500 is configure for the proliferated low earth orbit (pLEO) satellite constellation being developed by Space Development Agency (SDA). As per requirements of the SDA, the modem 500 can include an SDR configured to provide and process waveforms of the PLRC. Also, the SDR can be implemented for the requirements of the SDA and to include a single-chip PLRC waveform or modem based on a certain family of devices actable to the SDA. Such devices can include a family of devices that include the integration of DAC and ADC cores. Such a device can include a heterogeneous multiprocessing platform such as a multiprocessing system-on-chip (MP-SoC) device that provides 64-bit processor scalability while combining real-time control with soft and hard engines for graphics, video, waveform, and packet processing. The device that can implement the modem can also include a common real-time processor and programmable logic equipped platform, three distinct variants include dual application processor (CG) devices, quad application processor and GPU (EG) devices, and video codec (EV) devices, creating unlimited possibilities for applications such as 5G Wireless, 6G Wireless, Next-generation ADAS, and Industrial Internet-of-Things. In some examples, the device for the modem can include an RFSoC architecture that includes multiple application processors and two real-time processors integrated into the programmable logic, e.g., including 80K or more FPGA gates. The modem thus can have separate ICs for ADC and DAC and DUC and DDC, and can significantly benefit from a higher level of integration in RFSoCs due to the smaller PCB footprint and reduced overall power consumption. The RFSoC architecture in the modem can also provide a baseband or L-band output with PLRC waveforms.

In some embodiments, the blocks 506, or the transmit system of the modem, includes an Ethernet encapsulator (e.g., see converter 510), configured to perform Ethernet packet encapsulation such as include converting Ethernet packets to FSO frames (such as specified by SDA OCT standard for communication across an optical link). The blocks 506 can also include an encoder and modulator (e.g., see encoder 512 and modulator 514), generating samples of the PLRC waveform in the baseband. Modulation has support for Manchester encoding, pulse-position modulation (PPM) or on-off keying (OOK) burst mode, for example. The blocks 506 are also flexible in many aspects such as symbol rates, roll-off factors, code rates, and block sizes. The output of the modulator 514, for example, is handled by the DUC and the DAC of an RF data converter, allowing it to have the output either in baseband or L-band.

In some embodiments, the blocks 508, or the receive system of the modem, includes a demodulator configured to take samples in the baseband after processing with the ADC and DDC cores (e.g., see demodulator 516). The demodulator is flexible just like the modulator. It offers optional support for the OOK-NRZ modulation feature of the SDA OCT standard and provides fully synchronized complex symbols on the output. The blocks also includes a physical layer (PHY) rateless LT and low-density parity-check (LDPC) decoder, configured to perform deinterleaving and forward error correction on the demodulator output (e.g., see decoder 518). Also, the blocks 508 can include an Ethernet decapsulator, configured to assemble the sent Ethernet packets from SDA OCT baseband frames (e.g., see converter 520).

Also, to accommodate SDA requirements and for other reasons, the RFSoC architecture can have a soft-decision forward error-correction (SD-FEC) IP cores block with LT and LDPC codec support. This feature can be used to illustrate that the hardened IP cores can deliver over 1 Gbps of throughput at low latency, as well as lower power and smaller area than soft logic implementations. In some embodiments, the modem 500 includes integration of the SDR and its output on an RFSoC modem with photonics. In some cases, the RFSoC (e.g., FPGA-based) modem running the PLRC waveform with integrated photonics. And, such a scheme can include integrated DUC and DDC or DAC and ADC. The modem can also interact with optical or RF payloads from satellites such as LEO satellites.

Figure 6:
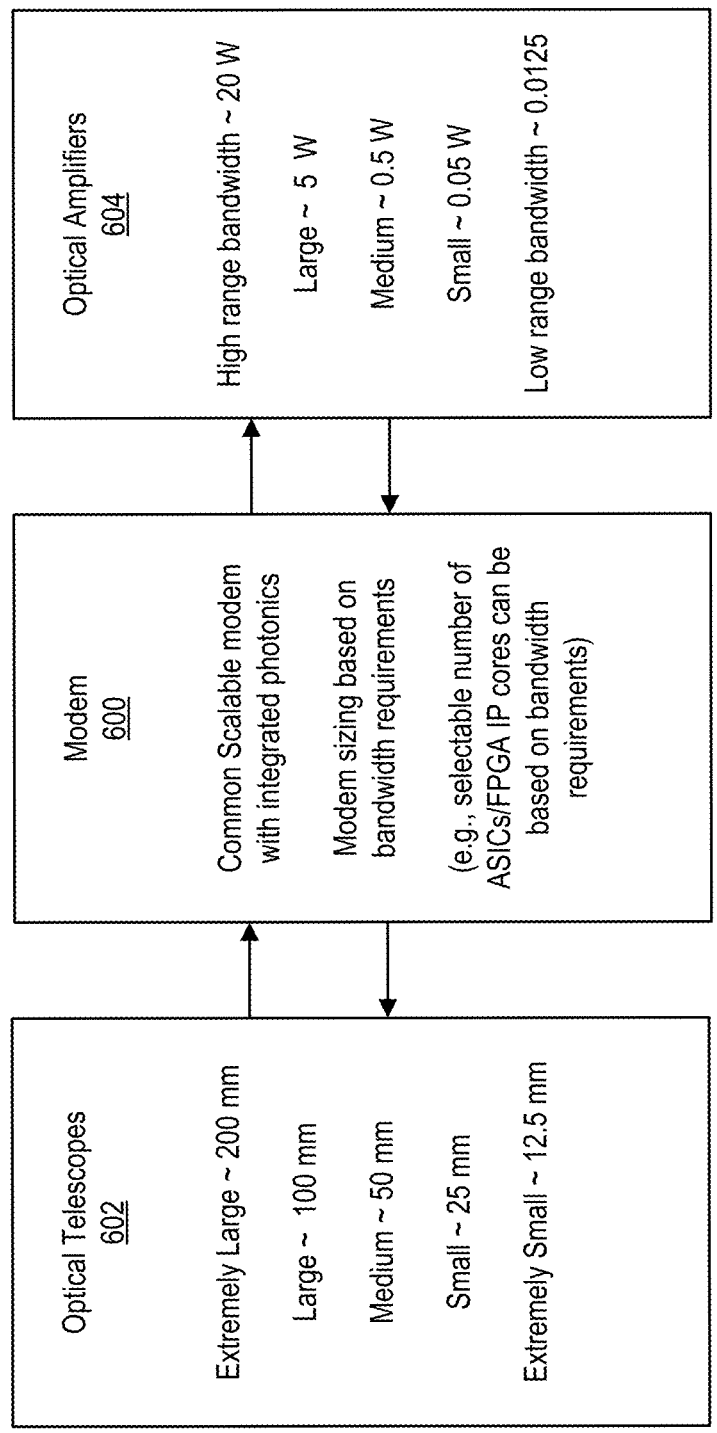
FIG. 6 illustrates a modem (such as the modem depicted in FIG. 5) interacting with various types of optical amplifiers and optical telescopes, in accordance with some embodiments of the present disclosure.

FIG. 6 illustrates a modem 600 (such as the modem depicted in FIG. 5) interacting with various types of optical amplifiers 604 and optical telescopes 602, in accordance with some embodiments of the present disclosure. FIG. 6 shows the capabilities of the modem 600 with respect to interactions with optical telescopes 602 and optical amplifiers 604. As shown, the optical telescopes 602 can have apertures that range from 200 mm to 12.5 mm. And, as shown, the amplifiers 604 can range from 20 W to 0.0125 W. The modem 600 can be, include, or be a part of modem 500.

Figure 7:
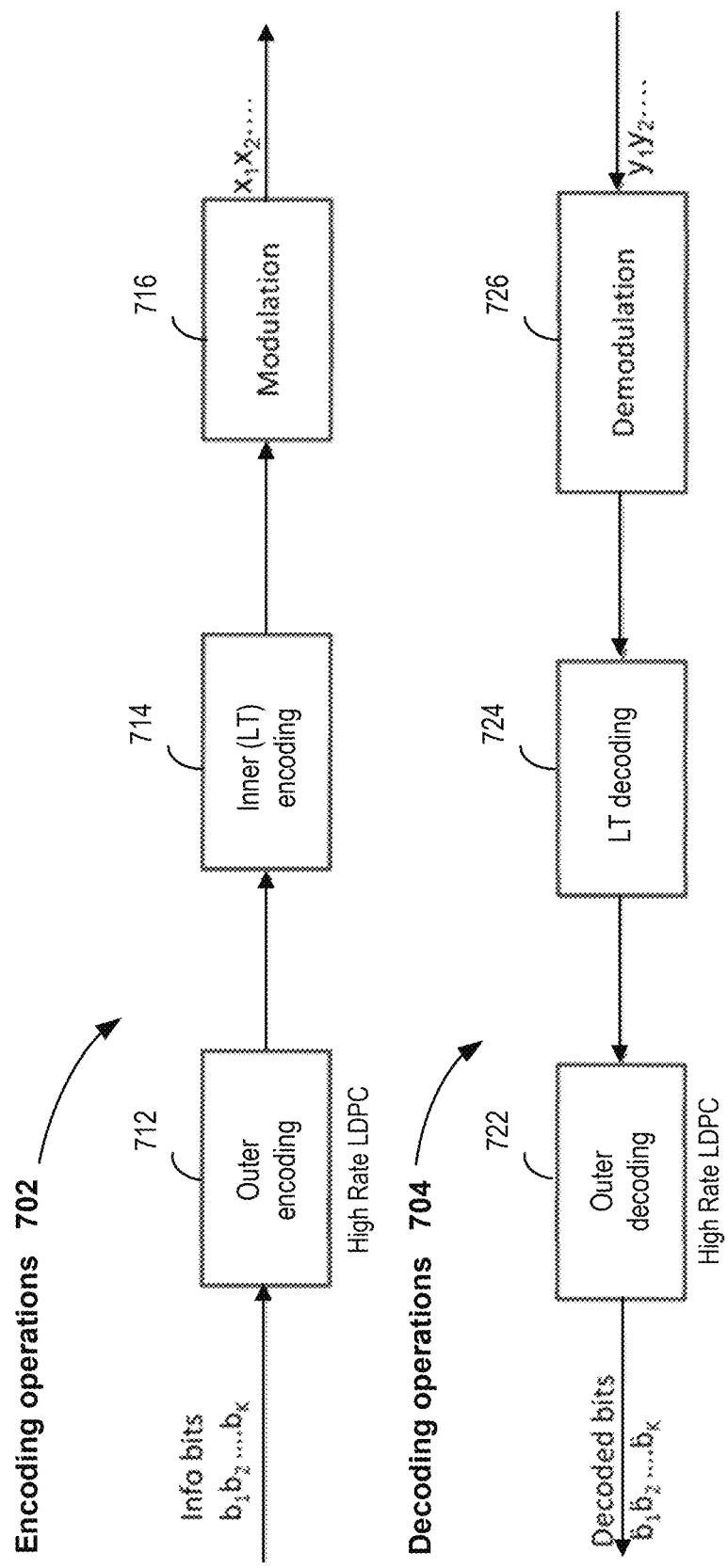
FIG. 7 illustrates an example of the physical layer rateless encoding and decoding based on the PLRC waveform, in accordance with some embodiments of the present disclosure (such as embodiments including or using the modem depicted in FIG. 5).

FIG. 7 illustrates an example of the physical layer rateless encoding 702 and decoding 704 based on the PLRC waveform, in accordance with some embodiments of the present disclosure (such as embodiments including or using the modem 500 depicted in FIG. 5 as well as the modem 600 shown in FIG. 6). In some embodiments, the PHY layer waveform processing as outlined in FIG. 7 for the PLRC waveform can be supported by the RFSoCs architecture and corresponding operating systems, such as systems cooperative with RSIC-V processors that include parallelized features and programmable logic. Also, for example, FIG. 7 shows operations of a SATCOM modem based on physical layer rateless codes (such as SATCOM operations that can be run by modem 500 and its blocks 506 and 508). The encoder, performing the encoding 702, and decoder, performing the decoding 704, can include and process component code that includes rateless code over additive white Gaussian noise (AWGN) channels with descending order degrees. As shown in FIG. 7, 'LDPC' represents use of a low density parity check at the outer encoding 712 and the outer decoding 722 and 'LT' represents use of a Luby Transform at the inner encoding 714 and the inner decoding 724.

The encoding 702 and decoding 704 shown in FIG. 7 use rateless codes to adapt the transmission rate to varying channel conditions and application requirements achieving higher throughput, higher coverage, lower computational costs, lower memory costs, and lower energy consumption. The physical layer rateless code is a channel coding or FEC technology for the reliable transmission of information bits between the transmitter and receiver in a wireless or satellite channel. The rateless codes have the ability to adapt both the code construction and the number of code bits to channel conditions, and provides for a link adaptive transmission based purely on physical layer rateless codes. Also, the physical layer codes can reduce or avoid the need for power control in a wireless or satellite communication system.

Figure 8:
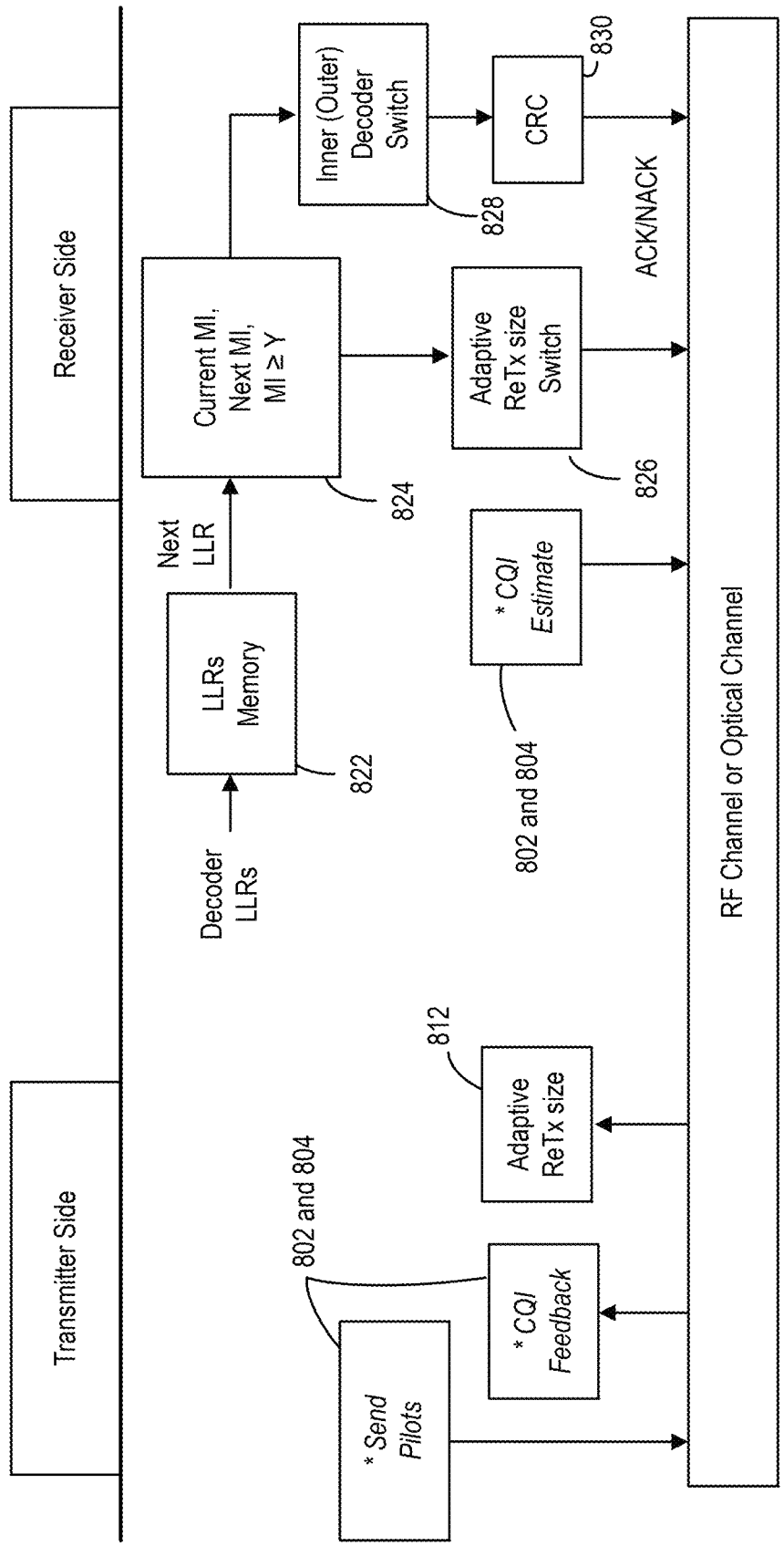
FIGS. 8 and 9 illustrate enhanced operations of a modem (such as a SATCOM modem) using physical layer rateless codes, in accordance with some embodiments of the present disclosure (such as embodiments including or using the modem depicted in FIG. 5).

To implement the encoding 702 and decoding 704, the modem 500 or 600 can use an adaptation approach of the PLRC technology. The encoding 702 can include a rateless encoding that uses source data and generates a stream of parity bits continuously via outer encoding 712 and inner encoding 714. The encoding 702 can construct a codeword by combining the source bits and parity bits, where the number of parity bits is determined based on the channel conditions and a determined code rate. The codeword is transmitted over a satellite or wireless channel, which can experience fading, noise, and interference. The decoding 704 can include rateless decoding at the receiver wherein it receives the samples of the codeword and attempts to recover the source data. The decoding 704 is iterative, where the decoding gradually accumulates parity bits until it can reliably decode the source data. The PLRC coding and decoding includes a link adaptation process that uses the physical layer rateless codes for FEC, which can supply an unending number of code bits (such as parity bits) as the channel conditions demand. An example illustration of the link adaptation process is shown in FIGS. 2, 4, and 8.

PLRC transmissions can accommodate from very high code-rates to very low code-rates. In some examples, the PLRC will not require an ARQ scheme except for an ACK signal. The PLRC based encoder and decoder can use low-density generator matrix (LDGM) computation-focused baseband algorithms for encoding, modulation, demodulation, and decoding for data communications (e.g., see operations 712, 714, 716, 722, 724, and 726). The PLRC has innate high resolution rate control with the potential advantage of higher throughput, higher coverage, lower computational costs, lower memory costs, and lower energy consumption.

The outer encoding 712 of the encoding 702 includes use of an outer code with a high rate R=0.95 LDPC code. The inner encoding 714 of the encoding 702 includes use of LT code for FEC. In some examples, it uses LT code over AWGN channels. The modulation 716 of the encoding 702 includes mapping a bit stream to complex transmit symbols. In some embodiments, the inner LT encoding of encoding 714 can generate an unending number of parity bits. Outer coding 712 can be used to clean up the error floors of the inner LT code. Modulation formats of modulation 716 can include BPSK, DP-QPSK, DPSK, OOK-NRZ and Manchester encoding.

The outer decoding 722 of the decoding 704 includes use of belief propagation or guessing random additive noise decoding (BP/GRAND) decoder for a high rate R=0.95 LDPC code. The inner decoding 724 of the decoding 704 includes use of the BP/GRAND decoder for an LT code for the FEC. In some examples, it also uses LT code designs over AWGN channels. In some embodiments, one or more demodulation formats of demodulation 726 correspond to the one or more formats used by the modulation 716 and can include corresponding decoding for BPSK, DP-QPSK, DPSK, OOK-NRZ and Manchester encoding.

FIG. 8 illustrates enhanced operations of a modem (such as a SATCOM modem) based on physical layer rateless codes (such as operations that can be run by modem 500 and blocks 506 and 508). The enhanced operations of FIG. 8 are enhancements over the current state-of-the-art operations or the operations shown in FIG. 7. The current state-of-the-art operations or the operations shown in FIG. 7 include drawbacks such as the multiple retransmissions increase the latency which may not be acceptable for certain use cases. For example, memory buffer size a hybrid automatic repeat request (HARQ) can increase significantly as it is proportional to the number of active code blocks. In addition, the multiple retransmissions increase the outer LDPC and inner LT decoder computational costs dramatically as the decoder is invoked per retransmission. For example, if a system working point is set for an average number of L retransmissions, the LT or LDPC decoder is invoked L times per code block, increasing its computational cost by at least a factor of L. The operations of FIG. 7 in combination with the operations shown in FIGS. 8 and 9 mitigate such shortcomings.

Figure 9:
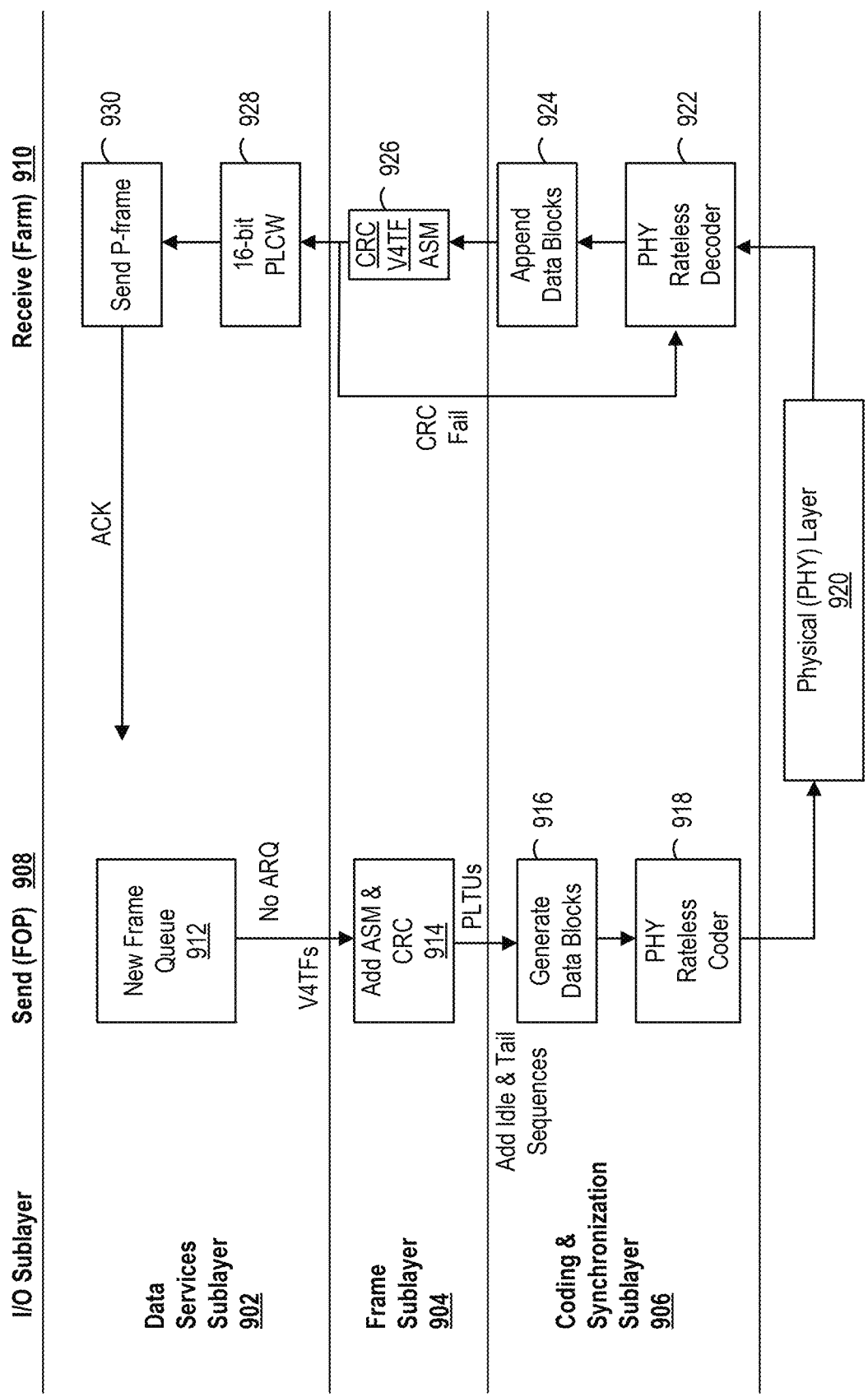

FIGS. 8 and 9 illustrate enhanced operations of a modem (such as a SATCOM modem) using physical layer rateless codes, in accordance with some embodiments of the present disclosure (such as embodiments including or using the modem 500 depicted in FIG. 5). Also, FIG. 8 shows an overview diagram of the PLRC link adaptation approach utilizing the physical layer rateless encoding and decoding which can be implemented through the encoder 512 and the decoder 518 respectively and shown by the operations illustrated in FIGS. 2 and 4. As shown in FIG. 8, mutual information (MI) between the encoder output x and decoder input LLRs y is I (x, y). The memory of the modem can collect enough parity symbols until the MI exceeds one or more thresholds. Once the MI thresholds are met, the modem can activate the LT or LDPC decoding. Also, as shown in FIG. 7, the modem can adapt the retransmission (ReTx) size based on the accumulated MI value and its distance from the threshold γ or |I (x, y) −γ|. Further, as shown, the feedback channel 802 can provide for the receiver sending feedback information to the transmitter through a feedback channel. This feedback indicates the channel conditions and the decoding status, which allows the transmitter to adjust the transmission parameters (e.g., rate, power, etc.) according to the feedback. Also, as shown, adaptive rate control 804 can provide rate control based on the feedback information, in which the transmitter adjusts the code rate or modulation scheme to optimize the performance of the link. This adaptive rate control mechanism ensures efficient utilization of the channel resources and maximizes the achievable throughput. The feedback channel 802 and the adaptive rate control 804 can be a part of the link adaptation technology as per the SDA OCT v4.0 standard. They are not a part of the PLRC technology but can be integrated with the PLRC technology. Example parts of the PLRC technology provide operations 812, 822, 824, 826, 828, and 830.

As shown in FIG. 8, example PLRC process interactions of the PLRC technology are grouped into interactions of the transmitter side, which can be provided by the encoder 512, and into interactions of receiver side, which can be provided by the encoder 518, for example. On the transmitter side, The feedback channel 802 and the adaptive rate control 804 can interact with the PLRC process of managing or updating the adaptive ReTx size at operation 812, via the RF channel or optical channel interacting with the PLRC technology. As shown, send pilots and CQI feedback operations of the feedback channel 802 and the adaptive rate control 804 can affect the PLRC process of managing or updating the adaptive ReTx size at operation 812. The encoder 512, in some examples, can adapt the ReTx size based on the accumulated MI value and its distance from the threshold γ or |I (x, y) −γ|.

In some embodiments, the feedback channel 802 and the adaptive rate control 804 are not used for implementing the PLRC technology. And, in some other embodiments the feedback channel 802 and the adaptive rate control 804 can be used with the PLRC technology to enhance it. For examples the feedback channel 802 and the adaptive rate control 804 can be used with QAM modulation for size adaptation.

On the receiver side, log-likelihood ratios (LLRs) of the decoder 518 for instance, can be stored in the memory of the modem at operation 822, and each current LLR can be compared to the next log-likelihood ratio (LLR) of the decoder at operation 824. The memory of the modem can collect enough parity symbols until the MI exceeds one or more thresholds, which is checked at operation 824 as well (such as by the decoder 518). Also, as shown in FIG. 8, the modem can adapt the ReTx size based on the accumulated MI value and its distance from the threshold γ or |I (x, y) −γ| at operation 826. Also, once the MI thresholds are met, the modem can activate the LT or LDPC decoding at operation 828. The operation 828 can be implemented partially via an inner (outer) decoder switch. Further, the modem can check for errors via a cyclic redundancy check (CRC) at operation 830, and the checking for the errors can affect the adaptive ReTx size.

As shown in FIG. 9, example PLRC processes are grouped by I/O sublayers including data services sublayer 902, frame sublayer 904, and coding and synchronization sublayer 906 as well as send-side operations 908 (e.g., operations of the transmitter 502 of modem 500) and receive-side operations 910 (e.g., operations of the receiver 504 of modem 500). The send-side operations 908 can start at the data services sublayer 902 with a new frame queue step 912 providing inputs (e.g., NoARQ and transfer frame inputs) for adding an attached sync marker (ASM) and CRC at step 914. The adding of the ASM and CRC at step 914 occurs at the frame sublayer 904 and provides inputs (e.g., PLTUs) for the generations of data blocks at step 916 and then in turn the PHY rateless encoding at step 918. The steps 916 and 918 occur at the coding and synchronization sublayer 906 and can include the adding of idle and tail sequences with the data blocks. The PHY layer rateless encoder then provides the input signal for the PHY layer 920. The PHY layer 920 transports the input signal provided by the PHY layer rateless encoder to the receive-side and its operations 910. The input signal is transported to the PHY layer rateless decoder and the decoder performs its decoding processes at step 922 and at the coding and synchronization sublayer 906. Afterwards, the data blocks from the signal are appended and further processed at step 924 at the coding and synchronization sublayer 906 of the send-side operations 910. The output of step 924 serves as inputs for adding ASM and CRC at step 926 at the frame sublayer 904 of the send-side operations 910, and can produce inputs for the data services sublayer 902 and feedback for the coding and synchronization sublayer 906 (e.g., NoARQ and transfer frame inputs and feedback). The generation of the input for the sublayer 902 of the receive-side operations 910 occurs at step 928 (e.g., a 16-bit PHY layer code word (PLCW) input) and is sent (e.g., via P-frames), at step 930, to the send-side or transmitter as an acknowledgement of the received signal from the send-side via the PHY layer 920.

Figure 10:
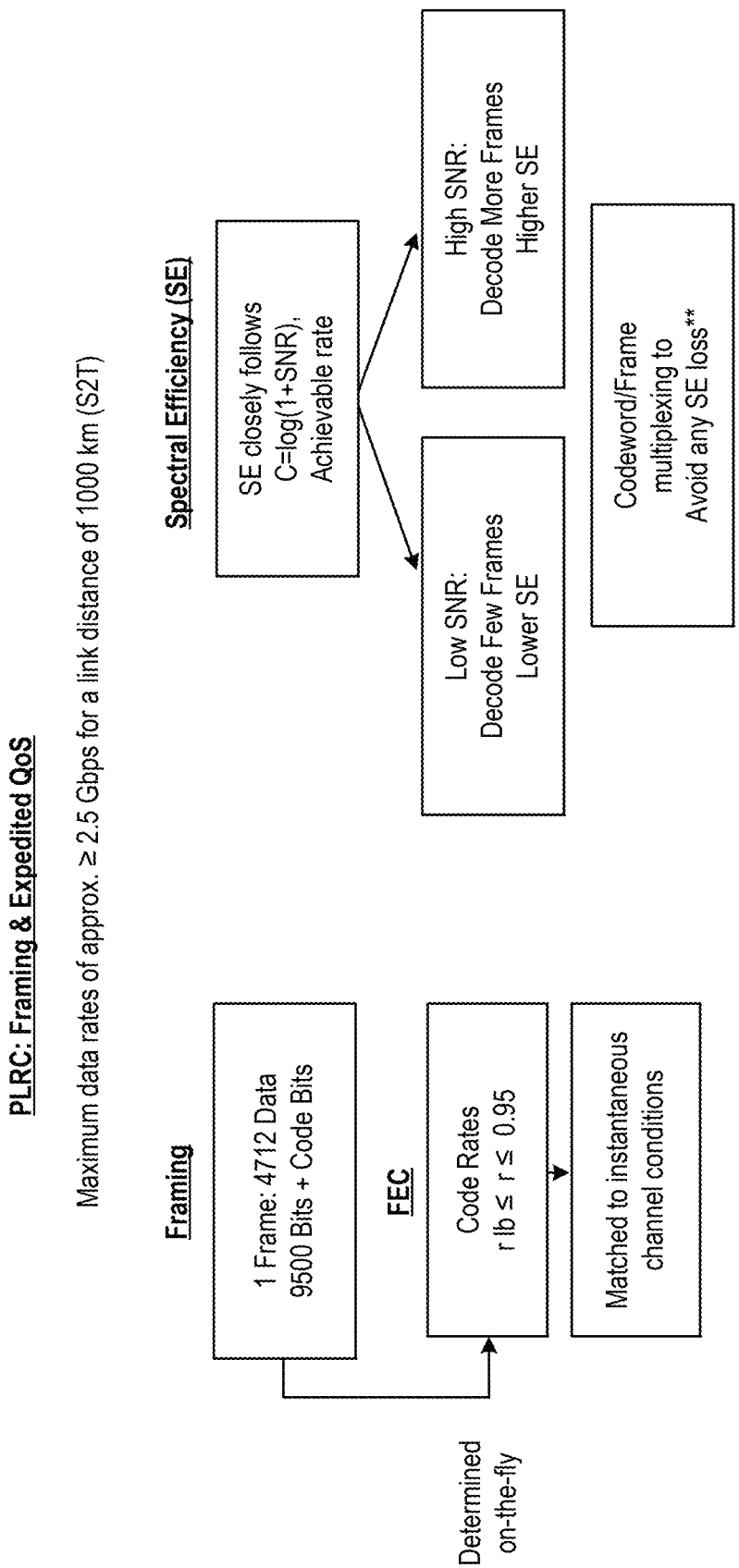

FIGS. 10 and 11 illustrate example benefits of the PLRC technologies and the enhanced operations shown in FIGS. 8 and 9, in accordance with some embodiments of the present disclosure. In general, an adaptive transmission policies in the PHY layer (such as policies implemented through the operations depicted in FIGS. 8 and 9) assist in maintaining reliable transmission of information bits between the satellite and user terminal in the presence of time-varying channel conditions. Such a feature can be accomplished by selecting the appropriate code types, coding rate, constellation size, modulation scheme, and by transmit power adaptation to channel conditions that can match the rate of transmission adaptively to the instantaneous satellite or wireless channel conditions, e.g., the signal to interference noise ratio (SINR). In some examples having optical communications links, a diverging optical signal can be transmitted through the vacuum of low earth orbit (LEO) space for S2S links and through a turbulent atmosphere for space-to-terrestrial (S2T) links. The atmosphere can affect optical links in two ways, for example. The atmosphere absorbs a portion of the light leading to a range-dependent attenuation of the signal. And, turbulent flow of the atmosphere modifies the wave-front and has several effects resulting in, for example, scintillation (e.g., variations in the signal intensity (and thereby the SNR), color, and position) and time-varying phase imparted on the signal.

In some embodiments, a link adaptation technology for wireless or satellite networks using the PLRC technology can be implemented via the operations shown in FIG. 8 and the operations shown in FIG. 9. Or, state-of-the-art link adaption algorithms can be used with the PLRC technology in various ways—but this may have some drawbacks in comparison to using aspects of the PLRC on their own. For example, the state-of-the-art link adaptation algorithms in 5G NR standard or SDA OCT standard use 5G NR LDPC codes. The modulation and coding scheme (MCS) is closely matched to the channel only when the transmitter knows the channel state information (CSI). Large scale fading, small scale fading and interference lead to variations in signal strength in a 5G wireless or satellite channel.

Also, carrier frequency, the velocity of the mobile terminal, satellite, surrounding reflectors and their angular spread determine the speed of channel variation. In 5G NTN networks, the satellite transmits periodic pilots to facilitate the MCS adaptation. After receiving the pilots, the terrestrial unit estimates the instantaneous channel quality, maps into a 4-bit channel quality information index and signals to the satellite for the best MCS or quadrature amplitude modulation (QAM) constellation size and code rate for the downlink waveform transmission. Slot is a fundamental time interval in the downlink transmission. Each slot contains one transport block, which is further segmented into several code blocks. Each code block is encoded using the 5G NR LDPC code. The overarching goal of a link adaptation algorithm is to transmit the transport blocks with an error rate of 10%. The MCS of each of the code blocks is determined via pilots. A transport block received in error is re-transmitted. The hybrid automatic repeat request scheme (or HARQ scheme) attempts to decode the transport block using the previous transmissions. For every retransmission of the ARQ protocol, additional latency is incurred by the SATCOM link and the spectral efficiency has a 4-6 dB backoff from the instantaneous link budget. The main drawback of the aforementioned technologies and the 5G NR LDPC code Link adaptation is the lack of adaptivity over a wide range of channel conditions. Therefore, current state-of-the-art communication systems cannot provide efficient enough error correction for a high baud rate over a wide range of binary and noisy channels. And, a link adaptation scheme using the state-of-the-art techniques fail to meet such goals since it does not track the channel variations in between the periodic pilots, which is not the case for rateless codes provide error correction.

Also, carrier frequency, the velocity of the mobile terminal, satellite, surrounding reflectors and their angular spread determine the speed of channel variation. In 5G NTN networks, the BS transmits periodic pilots to facilitate the MCS adaptation. After receiving the pilots, the UE estimates the instantaneous channel quality, maps into a 4-bit channel quality information index and signals to the MCS or QAM constellation size and code rate for the downlink waveform transmission. Slot is a fundamental time interval in the downlink transmission. Each slot contains one transport block, which is further segmented into several code blocks. Each code block is encoded using the 5G NR LDPC code. The overarching goal of a link adaptation algorithm is to transmit the transport blocks with an error rate of 10%. The MCS of each of the code blocks is determined via pilots. A transport block received in error is re-transmitted. The HARQ scheme attempts to decode the transport block using the previous transmissions. For every retransmission of the ARQ protocol, additional latency is incurred by the SATCOM link and the spectral efficiency has a 4-6 dB backoff from the instantaneous link budget. The main drawback of the current 5G NR LDPC code Link adaptation is the lack of adaptivity over a wide range of channel conditions. Therefore, current state-of-the-art communication systems cannot provide efficient enough error correction for a high baud rate over a wide range of binary and noisy channels. And, a link adaptation scheme using the state-of-the-art techniques fail to meet such goals since it does not track the channel variations in between the periodic pilots, which is not the case for rateless codes provide error correction.

Also, in 5G networks, a typical value for the time interval between pilots is 20 ms. Assuming IID block fading model, the coherence time Tc is a good indicator of whether the link adaptation scheme can track the channel quality with the use of pilots every 20 ms. The Tc changes rapidly with the UE speed. For a satellite at 600 km altitude with a 2 GHz carrier, for example, the Doppler shifts over the course of a 2.5-minute pass and Tc values are not effective as they should be. The ability of a link adaptation scheme to track the channel quality with the use of pilots every 'few ms' is very limited. The current 5G NR link adaptation based on periodic pilots (every 20 ms) cannot track the channel variations in the wireless or satellite channel of the very high bandwidth demand of future networks due to the very high carrier frequencies and the very high Satellite Doppler shifts. Matching the MCS to the instantaneous channel quality cannot be done by tracking the channel state using periodic pilots. Thus, such techniques are inferior to the techniques of the PLRC but aspects of such techniques can be combined with aspects of the PLRC in some embodiments. Whereas 5G NR makes use of the HARQ concept for transmission of transport blocks, the techniques used by the PLRC use physical layer rateless codes. In some embodiments, the codes of the PLRC can be combined with techniques of the HARQ for transmission of transport blocks. FIG. 8 and FIG. 9 show operations of a waveform architecture that is a transformative approach to link adaptation and address the mentioned shortcomings of the 5G NR LDPC code link adaptation and the other state-of-the-art techniques which are based on periodic pilots and HARQ. An example, approach of the PLRC allows the transmitter and receiver, such as via the encoder 512 and the decoder 518, or via other parts of the modem blocks 506 and 508, to directly negotiate without involving the upper layers beyond the link and physical layers (e.g., see FIGS. 8 and 9). As such, some of the benefits of using the PLRC are shown in FIGS. 10 and 11.

With reference to FIG. 9, in some embodiments, a simplified layered model of Layer 2 of SDA OCT Standard can be achieved with the addition of the PHY layer rateless codes. In the SDA OCT Standard, Layer 1 is termed PHY layer whereas the FEC codes are placed in Layer 2 (also known as the Data Link Layer of the OSI model). In some embodiments, the PHY layer rateless codes are the FEC codes in Layer 2. The phrase PHY layer rateless codes can include rateless codes on the noisy channel in some examples (such as the AWGN channel).

Also, in some example embodiments, the PLRC technologies can use amplitude modulation such as Manchester encoding, on-off keying (OOK) with NRZ (Non-Return to Zero), BPSK, DPSK and DP-QPSK. And, the PLRC technologies can use Link Adaptation schemes such as TB-HARQ, CB-HARQ and PLRC. In some examples, the PLRC technologies can evaluate link-level bit error rate, frame error rate and spectral efficiency.

Further, in some embodiments, receiver algorithms are supported such as channel decoder, detection, synchronization, channel estimation, channel equalization, and carrier frequency offset detection and correction, among others. Such support may overcome limitations in state-of-the-art technologies, e.g., receiver bandwidth limitations, transmitter/receiver isolation, receive decoder complexity for high order PSK, tradeoffs of soft-decisions in the maximum-likelihood decoder, etc.

In some embodiments, the PLRC technologies, such as for use cases including SATCOM networks, can replace, enhance, or be combined with the current state-of-the-art in link adaptation schemes for 5G TN (terrestrial) or NTN (non-terrestrial). Transport Block (TB) HARQ is a current state-of-the-art link adaptation scheme in the 5G NR standard. The constituent FEC code is the 5G NR Protograph-based LDPC. The information transport block size varies in accordance to the channel conditions. A CRC error for a single code block triggers the re-transmission of the entire transport block. In the SDA OCT standard, the transport block equivalent is an OTA (over-the-air) frame with an information block size of 8448 bits. For the SDA OCT standard, the current approach for link adaptation utilizes the Protograph-based LDPC code for FEC and the OTA frame level HARQ for retransmissions. The ARQ scheme used is the Go-Back-N version. Whereas, the PLRC technologies use operations and schemes shown in FIGS. 8 and 9. Code Block (CB) HARQ is not strictly supported in the current 5G specification. It can be supported in 5G NR as an extension of the TB HARQ with relatively small change. The link adaptation approach is similar to TB HARQ with the exception that a CRC error for a single code block triggers the re-transmission of only that one code block. Code blocks can be grouped with up to eight code blocks groups in a slot such that retransmission per code block group can be enabled. The ARQ scheme used can be the Selective Repeat ARQ.

FIG. 10 shows a high level or architectural overview of the PLRC link adaptation technology. The PLRC link adaptation technology provides an architectural overview to develop a higher throughput, high Coverage, and lower SWaP-C modem solution to close the performance gap between the theoretical upper bound and system throughput (such as the system throughput of a satellite of the SDA), and it can reduce SNR and minimize the retransmissions to increase spectral efficiency (SE) since FEC is dependent on high retransmissions. With free-space optical communications (FSOC) links, high baud rate modems (e.g., having >100 Gbps) are frequently used for high-speed data transport in LEO satellite networks. For satellite speeds and satellite Dopplers, the throughput gap between the theoretical upper bound and the SDA OCT V4.0 based system throughput curves will be very large for the S2S and S2T links. The enhanced approach to reduce the throughput gap between the upper bound and system throughput curves is to use the PLRC link adaptation technique or a combination of the current state-of-the-art techniques with the PLRC link adaptation technique.

Benefits of PLRC technologies include higher throughput such as by high resolution rate control and continuously adapting the transmission rate to the channel conditions, PLRC can achieve higher throughput than traditional HARQ schemes. Benefits of PLRC technologies also include higher coverage such that the PLRC techniques can extend the coverage of satellite or wireless networks by allowing transmit and receive devices to operate at lower signal-to-noise ratios. Benefits of PLRC technologies also include lower computational costs. For example, PLRC has lower computational costs than traditional HARQ schemes due to the LDGM based encoder and decoder operations, and reduced retransmissions. Also, PLRC can have lower memory costs. For example, it has lower memory costs than traditional HARQ schemes due to efficient retransmissions and decoding attempts. Also, PLRC technologies include lower energy consumption in that PLRC has lower energy consumption due to lower memory costs, computational costs, and feedback costs than traditional HARQ schemes.

As shown by FIG. 11, PLRC can be used to improve the performance of high-throughput satellite links. It has increased data volume. In that it can send more data from space to Earth, and PLRC can increase the downlink data rate for customers. PLRC can be used to increase the data volume sent from space to Earth by 50%. This can be beneficial for applications such as video streaming of commercial Earth Observation data, which require a high data rate. PLRC can provide reduced latency in that it can be used to reduce the latency of satellite links by minimizing the need for retransmissions. PLRC can also provide OCT downlink capability in that it is well suited for OCT downlink on S2T links from LEO satellite optical payloads to OCT equipped platforms such as transportable ground stations (TGS), maritime targeting cells (MTC), and unmanned aerial vehicles (UAV). PLRC can also be used on RF downlinks such as Link 16 (L-band)-20 MHz, S-band (50 MHz), C-band (100 MHz), Ku-band (240 MHz), and Ka-band (400 MHz). Also, PLRC can provide high throughput OCT downlinks (such as S2T links) capability can create transformative new use cases requiring terrestrial fiber-optic connectivity speeds.

Additionally, the modems described herein that implement the PLRC can be reconfigurable. The modems can be configurable for run multiple types of waveforms on a single SDR and Ka-band RF front end. The waveforms of interest can include, ANTS, Waveform Y, Legacy TACSATCOM, Link-182, and PTW. In a payload that is capable of multiple waveforms, the modems can provide a common waveform processing architecture for all the listed waveforms. Also, they can provide a common security processing architecture for all the listed waveforms as well as timeframes and methods for on-orbit changes to waveform parameters and SDR reprogramming to swap waveforms. Also, the PLRC technologies can be adapted by means of codeword or frame multiplexing to support long haul optical links, e.g., LEO satellite to marine or ground links.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

While the invention has been described in conjunction with the specific embodiments described herein, such as embodiments for military use of the computing systems described herein, it is evident that many alternatives, combinations, modifications and variations are apparent to those skilled in the art and that embodiments can be applied to many different types of applications and use cases. Accordingly, the example embodiments of the invention, as set forth herein are intended to be illustrative only, and not in a limiting sense. Various changes can be made without departing from the spirit and scope of the invention.

What is claimed is:

1. A system, comprising:
   a transmitter module, configured to generate an output signal for transmission through electromagnetic radiation, and the transmitter module comprising:
   a first converter, configured to convert data carried in a first type of data link layer protocol data unit to data carried in a second type of data link layer protocol data unit;
   a forward error correction encoder, configured to encode the converted data (which is converted by the first converter), using a forward error correction encoding process, wherein the encoding of the data is rateless; and
   a modulator, configured to modulate the encoded data to generate the output signal; and
   a receiver module, configured to generate data carried in the first type of data link layer protocol data unit from an input signal received through electromagnetic radiation, and the receiver module comprising:
   a demodulator, configured to demodulate the input signal to generate demodulated data;
   a forward error correction decoder, configured to decode the demodulated data using a forward error correction decoding process, wherein an output of the forward error correction decoder comprises data carried in the second type of data link layer protocol data unit, and wherein the decoding of the data is rateless; and a second converter, configured to convert the decoded date, carried in the second type of data link layer protocol data unit, to data carried in the first type of data link layer protocol data unit; and wherein the input signal received through a laser beam and the output signal is transmitted through a laser beam; and wherein the input signal and the output signal are communicated at ten thousand or greater optical communications terminal (OCT) frames per ten milliseconds or at least one million OCT frames per second.

2. The system of claim 1, wherein the input signal and the output signal is communicated via a low Earth orbit (LEO) link between a satellite in low Earth orbit and a ground station.

3. The system of claim 1, wherein the input signal and the output signal is communicated via a space-to-space (S2S) link, a space-to-air (S2A) link, a space-to-maritime (S2M) link, or a space-to-ground (S2G) link.

4. The system of claim 1, wherein the system comprises an optical laser configured to generate a laser beam that carries the output signal.

5. The system of claim 1, wherein the system comprises a photodiode detector configured to receive an input signal from a laser beam.

6. The system of claim 1, wherein the first type of data link layer protocol data unit is an Ethernet frame and the second type of data link layer protocol data unit is a Free Space Optical (FSO) frame.

7. The system of claim 1, wherein the transmitter module and the receiver module are part of a software-defined radio (SDR) and reconfigurable via software changes.

8. The system of claim 1, wherein the transmitter module and the receiver module are implemented on a single printed circuit board.

9. The system of claim 1, wherein the forward error correction encoder comprises a physical layer rateless encoder configured to generate parity bits based on source bits and then combine the source bits with the parity bits.

10. The system of claim 9, wherein the forward error correction encoder is at least partially implemented by a rateless Luby Transform (LT) for the physical layer, and wherein the forward error correction encoder is further configured to integrate bits encoded by the rateless LT to a symbol mapper, which maps bits to finite constellation Quadrature Amplitude Modulation (QAM) symbols.

11. The system of claim 10, wherein the generation of the parity bits is further based on channel conditions.

12. The system of claim 10,
wherein Nt is a number of parity symbols,
wherein Ct is an achievable rate of a channel, and
wherein for each OCT frame with K source bits, the forward error correction encoder is configured to maintain KNt<Ct.

13. The system of claim 10, wherein a spectral efficiency (SE) is matched to a channel achievable rate, which increases the SE for high signal-to-noise ratio (SNR) channel conditions and moderates SE for low SNR channel conditions.

14. The system of claim 1, wherein the forward error correction decoder comprises a physical layer rateless decoder configured to recover source data by accumulating parity bits until a threshold number of parity bits is reached that identifies that the source data is reliably decoded.

15. The system of claim 14, wherein the physical layer rateless decoder is configured to decode source data until an acknowledgement is sent in response to either the threshold number being reached or a delay constraint being reached.

16. The system of claim 14, wherein the forward error correction decoder is configured to track and compare mutual information (MI) between encoder outputs of the forward error correction encoder and decoder inputs of the forward error correction decoder until the comparison of the MI exceeds one or more MI thresholds.

17. The system of claim 16, wherein the forward error correction decoder is configured to activate a Luby Transform (LT) of the rateless decoder once the comparison of the MI exceeds one or more MI thresholds.

18. The system of claim 16, wherein the forward error correction encoder is configured to adapt a retransmission size based on an accumulated MI value and a distance from a corresponding threshold.

19. A system, comprising:
a transmitter module, configured to generate output signal for transmission through electromagnetic radiation, and the transmitter module comprising:
a first converter, configured to convert data carried in Ethernet frames to data carried in Free Space Optical (FSO) frames;
a forward error correction encoder, configured to encode the converted data, which is converted by the first converter, using a forward error correction encoding process, wherein the encoding of the data is rateless; and
a modulator, configured to modulate the encoded data to generate the output signal; and
a receiver module, configured to generate data carried in Ethernet frames from an input signal received through electromagnetic radiation, and the receiver module comprising:
a demodulator, configured to demodulate the input signal to generate demodulated data;
a forward error correction decoder, configured to decode the demodulated data using a forward error correction decoding process, wherein an output of the forward error correction decoder comprises data carried in FSO frames, and wherein the decoding of the data is rateless; and
a second converter, configured to convert the decoded data, which is carried in FSO frames, to data carried in Ethernet frames; and
wherein the input signal is received through a laser beam and the output signal is transmitted through a laser beam; and
wherein the input signal and the output signal are communicated at ten thousand or greater optical communications terminal (OCT) frames per ten milliseconds.

20. A system, comprising:
a transmitter module, configured to generate output signal for transmission through electromagnetic radiation, and the transmitter module comprising:
a first converter, configured to convert data carried in Ethernet frames to data carried in a second type of data link frames;
a forward error correction encoder, configured to encode the converted data, which is converted by the first converter, using a forward error correction encoding process; and
a modulator, configured to modulate the encoded data to generate the output signal; and a receiver module, configured to generate data carried in Ethernet frames from input signal received through electromagnetic radiation, and the receiver module comprising:
  a demodulator, configured to demodulate the input signal to generate demodulated data;
  a forward error correction decoder, configured to decode the demodulated data using a forward error correction decoding process, wherein an output of the forward error correction decoder comprises data carried in the second type of data link frames, and wherein the decoding of the data is rateless; and
  a second converter, configured to convert the decoded data, which is carried in the second type of data link frames, to data carried in Ethernet frames; and
wherein the input signal is received through a laser beam and the output signal is transmitted through a laser beam; and
wherein the input signal and the output signal are communicated at ten thousand or greater optical communications terminal (OCT) frames per ten milliseconds.

\* \* \* \* \*